United States Patent [19]
Cullen et al.

[11] Patent Number: 6,126,775
[45] Date of Patent: Oct. 3, 2000

[54] METHOD OF MICROFABRICATION

[75] Inventors: Robert R. Cullen, Glendora; Richard J. Sweeney, Fullerton, both of Calif.

[73] Assignee: Horizon Photonics, LLC, Walnut, Calif.

[21] Appl. No.: 09/228,659

[22] Filed: Jan. 12, 1999

Related U.S. Application Data

[60] Provisional application No. 60/073,900, Feb. 6, 1998.

[51] Int. Cl.⁷ .............................. B32B 31/12; B32B 31/18
[52] U.S. Cl. ......................... 156/293; 156/250; 156/299; 156/303.1; 359/900
[58] Field of Search .............................. 156/99, 250, 293, 156/297, 299, 303.1, 552; 359/280, 281, 282, 283, 900; 228/262.9; 430/320, 321

[56] References Cited

U.S. PATENT DOCUMENTS

| | | |
|---|---|---|
| 4,612,500 | 9/1986 | Chen et al. . |
| 4,712,880 | 12/1987 | Shirasaki . |
| 4,752,352 | 6/1988 | Feygin . |
| 5,198,923 | 3/1993 | Watanabe et al. . |
| 5,305,137 | 4/1994 | Ohkawara . |
| 5,341,235 | 8/1994 | Watanabe et al. ................. 359/281 |
| 5,867,314 | 2/1999 | Ota et al. ........................... 359/484 |
| 5,945,042 | 8/1999 | Mimura et al. . |

OTHER PUBLICATIONS

Special Report on Optical Isolator reliability issues, Dec. 1993.
Copy of International Search Report corresponding to PCT/US00/00708.

*Primary Examiner*—Jeff H. Aftergut
*Assistant Examiner*—John T Haran
*Attorney, Agent, or Firm*—Knobbe, Martens, Olson & Bear, LLP

[57] ABSTRACT

A temperature compensated optical isolator and a method of manufacturing optical assemblies. The isolator utilizes a bimetallic element to rotate a polarization element of the isolator in response to temperature variations. The isolator maintains an effectively constant isolation over a substantially wide temperature range. Advantageously, the isolator is simple, compact and a viable solution to a wide range of optical applications. The manufacturing method employs a lamination procedure to create an array of optics-receiving micro-fixtures. The method is well adapted for the automated manufacturing of optical assemblies. Desirably, the method provides for high speed, high volume production, thereby advantageously, maintaining low manufacturing costs.

32 Claims, 24 Drawing Sheets

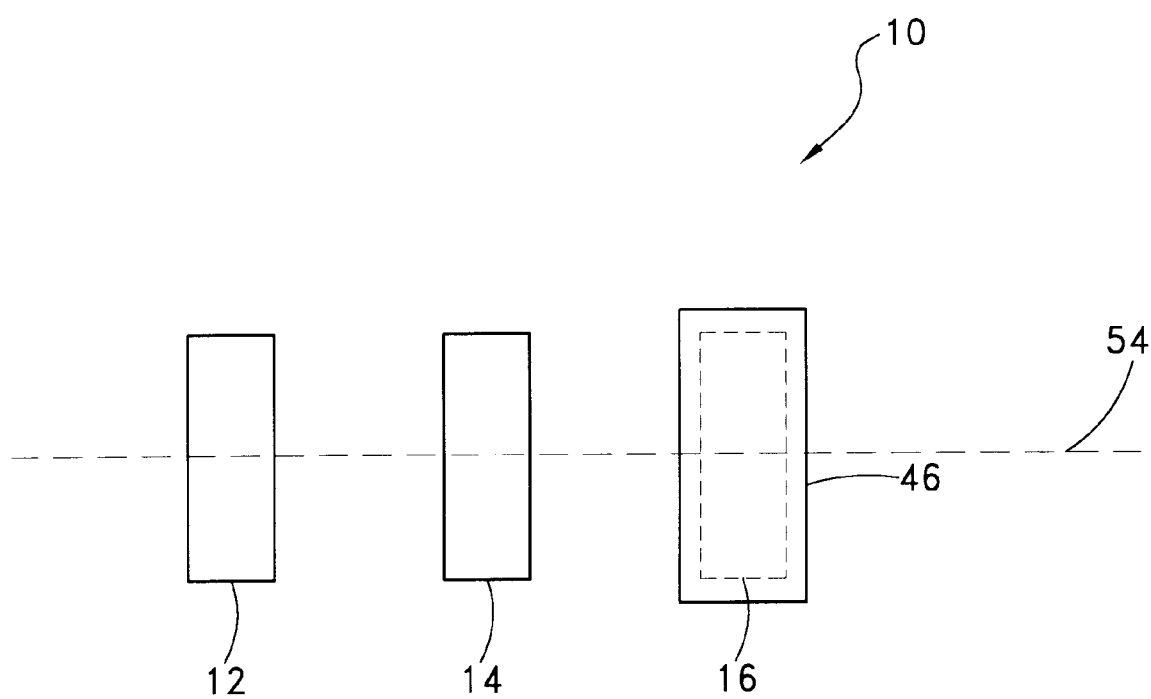

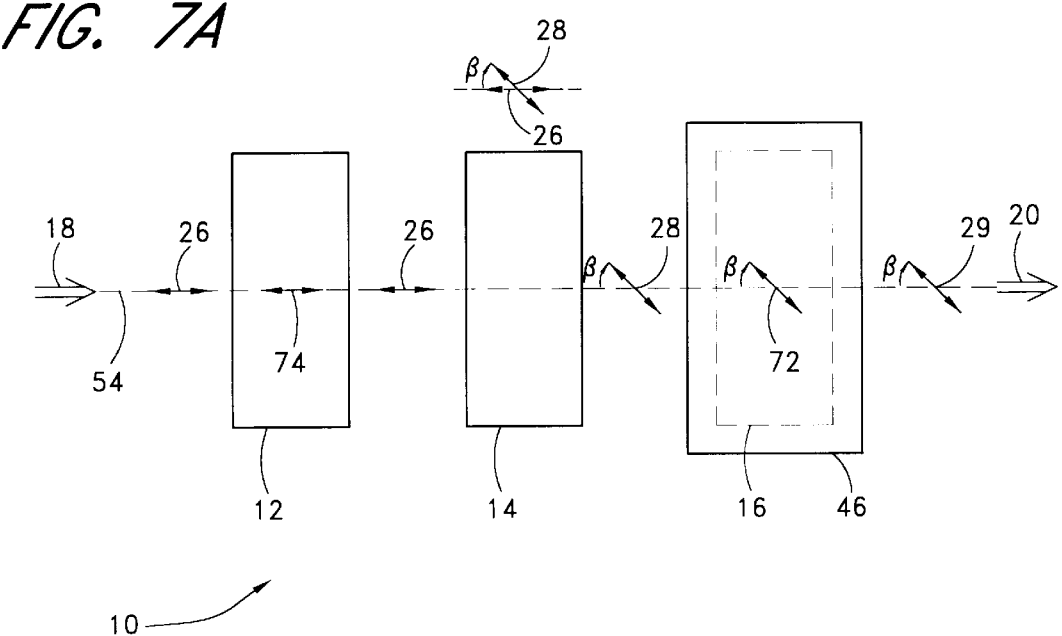
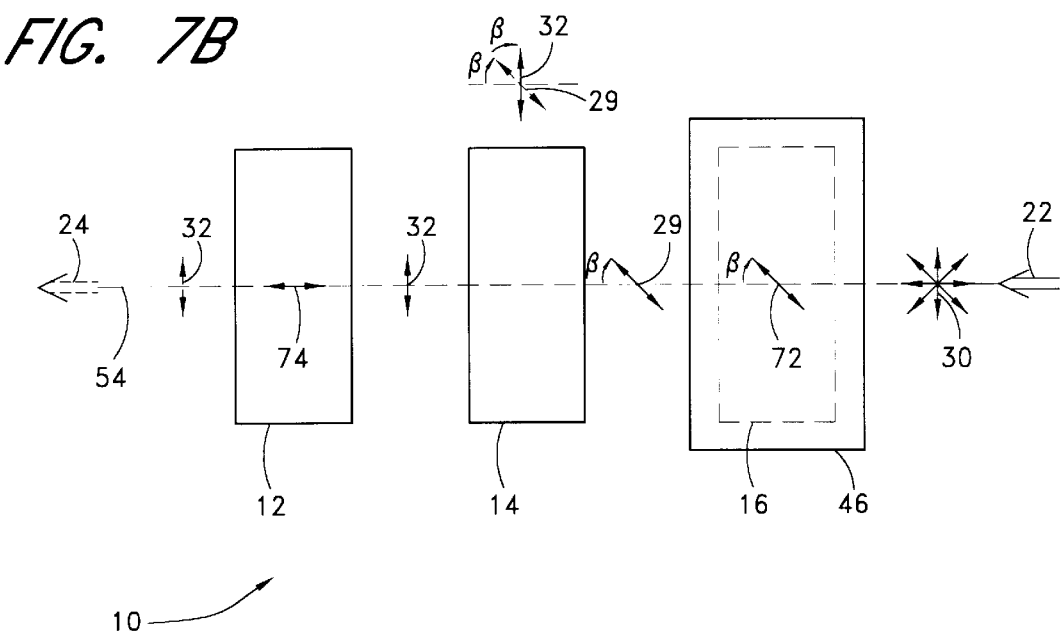

FIG. 14A
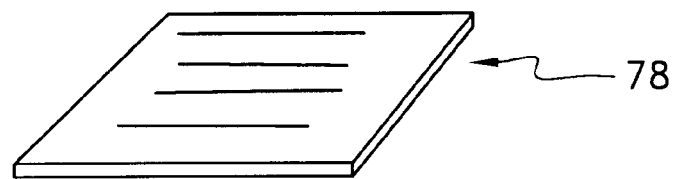
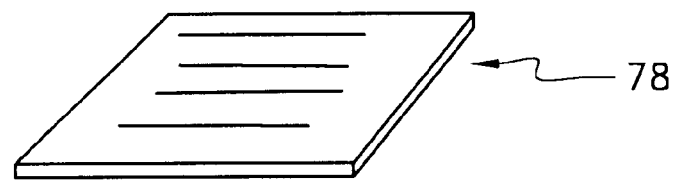
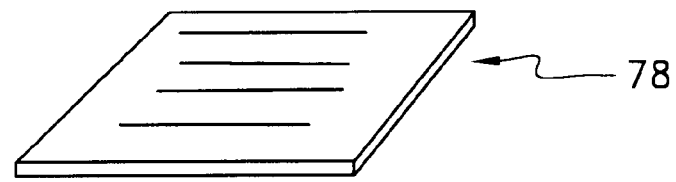
FIG. 14B
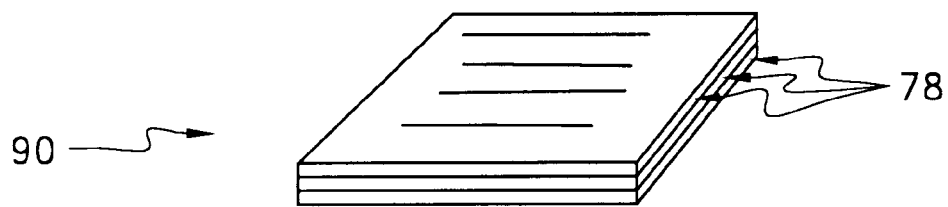

FIG. 15A
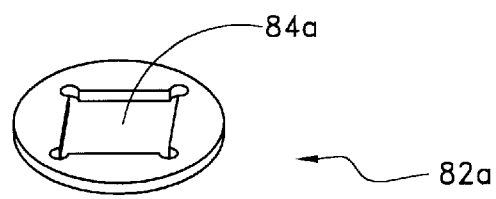
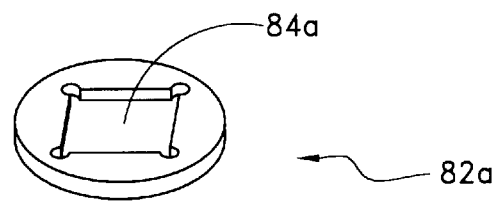
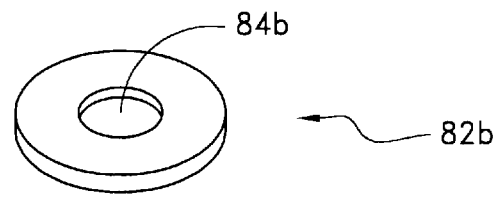
FIG. 15B
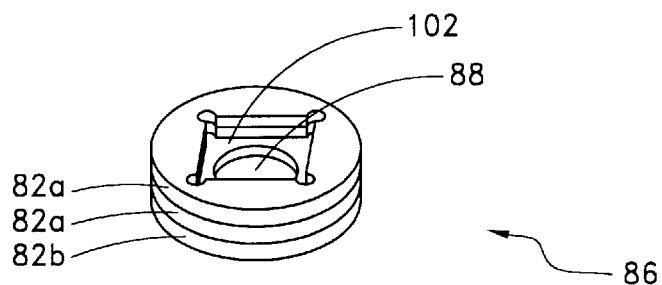
FIG. 15C
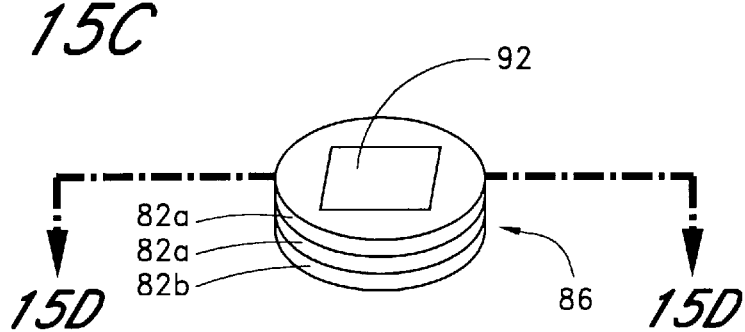

METHOD OF MICROFABRICATION

RELATED APPLICATIONS

This application claims the benefit of U.S. Provisional Application No. 60/073,900, filed Feb. 6, 1998.

BACKGROUND OF THE INVENTION

1. Field of the Invention

The present invention relates generally to optical devices and, in particular, to a temperature compensator for a Faraday rotator and a lamination-based method for manufacturing of optical assemblies and other small components.

2. Background of the Related Art

When light rays emitted from a light source are transmitted through an optical system, part of the light rays will be reflected at the end face of the optical system and transmitted back to the light source, unless means are employed to prevent such back reflection. For instance, in transmitting an optical signal through an optical fiber, if a light beam emitted from a laser light source is projected onto the end face of the optical fiber through, for example, a lens, the majority of the light thereof will be transmitted through the optical fiber as transmitted light beam. But, a part of the light thereof will be surface reflected at the end faces of the lens and the optical fiber and transmitted back to the laser light source. This back reflected light will again be reflected at the surface of the laser light source, thereby creating undesirable reflection-induced noise.

To eliminate such noise, an optical isolator, as described for instance in Bellcore's Special Report, *Optical Isolators: Reliability Issues*, SR-NWT-002855, Issue 1, December 1993, Pages 1–3, incorporated herein by reference, may be used. This is an example of an optical device that allows light to propagate (with relatively low loss) in one direction but isolates reflected light from propagating in the reverse direction. Optical isolators are used to improve the performance of many devices such as external modulators, distributed feedback lasers, Fabry-Perot lasers, semiconductor amplifiers, and diode-pumped solid-state lasers among others.

Optical isolators are typically passive, non-reciprocal optical devices based on the Faraday effect. In 1842, Michael Faraday discovered that the plane of polarized light rotates while transmitting through glass which is contained in a magnetic field. The Faraday effect is non-reciprocal, meaning that the direction of rotation is independent of the direction of light propagation, and only dependent upon the direction of the magnetic field. Most commercial optical isolators utilize this effect to isolate various parts of an optical communication system from reflection-induced noise.

Typically, an optical isolator consists of a magneto-optical material called a Faraday rotator which is sandwiched between a pair of polarization elements commonly referred to as a polarizer and an analyzer. The Faraday rotator is used in optical devices, such as the optical isolator, to rotate the plane of polarization that is incident upon it by a predetermined amount, usually by 45° either clockwise or counter clockwise. Typically, the Faraday rotator is a garnet crystalline structure with an inherent magnetic field, so that the direction of Faraday rotation is predetermined. In some cases an external magnetic field may be needed to activate the Faraday rotator. In such cases, the direction of Faraday rotation is dependent on the orientation of the magnetic field but not on the direction of light propagation. As used in the telecommunication industry, the Faraday rotator is essential to many devices that utilize its properties in combination with reciprocal polarization elements.

In the pass (forward) direction, light incident on the polarizer will pass through the polarizer without obstruction if its plane of polarization coincides with that of the polarizer. When this light passes through the Faraday rotator its plane of polarization is rotated by 45° due to the magneto-optic effect. The direction of rotation, that is, clockwise or counter clockwise, is dependent on the particular Faraday rotator configuration and is predetermined. The light then passes through the analyzer without loss, since the axis of polarization of the analyzer is oriented at the same 45°.

In the blocking (reverse) direction, reflected light of arbitrary polarization is incident on the analyzer which transmits some of this light and polarizes it to match its axis of polarization. When this polarized reflected light passes through the Faraday rotator its plane of polarization is again rotated by 45°, clockwise or counterclockwise relative to the direction of light travel, as is predetermined. As a result, the plane of polarization of the reflected light incident on the polarizer is perpendicular to its axis of polarization, and, thus the reflected light is blocked by the polarizer. In this manner, the optical isolator is used to transmit light from a source in the pass (forward) direction and essentially extinguish any reflected light in the blocking (reverse) direction. This extinguishing effect is commonly known as "isolation".

The magnitude of the rotation of the plane of polarization of light passing through the Faraday rotator depends on several factors, such as, the strength of the magnetic field, the nature of the material that constitutes the rotator, the frequency of the light, the temperature, and other parameters. Since the components in many optical applications utilizing the Faraday effect may be exposed to temperature variations, the rotational temperature dependency of the Faraday rotator limits the use of Faraday rotators in devices which do not provide some form of temperature compensation to prevent or minimize degradation in performance.

The rotational temperature dependency of a Faraday rotator can be expressed in terms of a temperature coefficient of rotation, $C_{ROT}$, defined as:

$$C_{ROT} = \frac{d\theta}{dT}$$

where, $\theta$ is the rotation of the plane of polarized light passing through the Faraday rotator, and $T$ is the temperature. A typical Faraday rotator may have a temperature coefficient with a magnitude of as much as about 0.10°/° C. which can cause a variation of Faraday rotation of about 12° over a temperature range of about −40° C. to 85° C. Of course, such undesirable rotation of the light can have significant detrimental effects on the performance of an optical device both in terms of forward transmissivity and degree of reverse isolation. But, since isolation (attenuation in the blocking direction) is measured very close to zero, small changes can have orders of magnitude effects on the degree of isolation in terms of the blocking direction transmission of reflected light.

One proposed solution to this problem is to provide temperature compensation via a cooling/heating source which maintains the temperature of the Faraday rotator, and possibly the temperature of the entire device, including for example, the laser source, at the required value. This would require that the temperature of the Faraday rotator be monitored and the output from the cooling/heating source be adjusted accordingly. Thus, the components required in such a temperature compensation system would include a cooling/heating source, temperature measurement device, a feedback system, and a power supply among others. Disadvantageously, such a temperature compensation scheme not only adds to the complexity and cost of the device, but, also to the size of the optical device which can limit the use of the device in many applications.

In some cases, a cascaded isolator, such as a double stage isolator, is utilized to compensate for the effects of temperature variance on optical isolators. Typically, a double stage isolator utilizes a polarizer, a Faraday rotator, an analyzer/polarizer, a second Faraday rotator, and a second analyzer arranged in this sequence. This effectively provides two stages of optical isolators in series. Typically, to compensate for temperature variations, one stage is "de-tuned" to an offset temperature above the ambient temperature while the other stage is "de-tuned" to an offset temperature correspondingly below the ambient temperature so as to provide a more broad-band response between the two temperature extremes. However, such detuning results in overall degraded isolation performance over the temperature range and at the nominal design temperature. Another proposed solution is to cascade multiple stages of isolators. But, the use of cascaded isolators in an optical device, undesirably, not only adds to the complexity, cost and size of the device, but, also increases the number of components needed, and increases the optical path of the light while reducing overall transmissivity through the cascaded isolators.

Optical components, such as the polarizer, the Faraday rotator, and the analyzer of a typical optical compensator, are commonly fixed in an assembly or attached to a common substrate. The primary approach, in the industry to date, to fixturing optical components involves the implementation of screw-machined barrels or small blocks with counter-bored features machined in. The optical components are placed in these machined cavities which typically tend to be small in size (for example, less than 2 mm in diameter). Not only is the machining process of generally tiny metal fixtures a costly and time consuming operation, but, also the discrete approach of fixing the optical components is generally not suited for mass automation. Undesirably, such a method of fixturing optical components is labor intensive and leads to higher manufacturing costs and lower manufacturing efficiency.

Thus, there is a need for providing a Faraday rotator temperature compensator that is simple, low cost and dimensionally small and there is a need to provide an efficient and low cost method that is well adapted for the automated manufacturing of such optical assemblies and other small components.

SUMMARY OF THE INVENTION

An optical isolator constructed in accordance with one preferred embodiment of the present invention overcomes some or all of the afore-mentioned disadvantages. The optical isolator utilizes the expansion/contraction properties of a bimetallic element to compensate for the effect temperature on Faraday rotation. The method also employs, in one embodiment, a lamination manufacturing procedure to create an array of optics-receiving micro-fixtures for receiving or forming optical assemblies.

The present invention provides thermal compensation in devices utilizing magneto-optical materials, such as Faraday rotators, by utilizing the opening and closing arcing motion of coiled bimetallic metal strips due to their expansion/contraction when exposed to temperature variations. A polarization element is attached to a bimetallic element which allows correction for temperature induced Faraday rotation. The bimetallic element is configured to optimally match the degree of temperature-induced drift in the Faraday rotation with the rotation of the polarization element.

In one preferred embodiment of the present invention a temperature compensated optical isolator is provided. Preferably, the optical isolator includes a pair of polarization elements, a Faraday rotator and a bimetallic element. One of the polarization elements is an optical polarizer while the other polarization element is an optical analyzer. The Faraday rotator is positioned between the polarizer and analyzer. The bimetallic element is attached between the analyzer and a base which houses the polarizer, Faraday rotator, analyzer and bimetallic element.

Advantageously, the bimetallic element of the present invention is configured to optimally conform with the temperature induced changes in Faraday rotation. By rotating the axis of polarization of the analyzer the bimetallic element ensures that any back-reflected light incident on the polarizer has a plane of polarization substantially perpendicular to the polarizer's axis of polarization. Thus, all or most of the back-reflected light incident on the polarizer will be effectively extinguished, thereby essentially eliminating any temperature-induced degradation in the effective isolation of the optical system.

Advantageously, the bimetallic element of the present invention can be tailored to meet the particular characteristics of the magneto-optical material and is hence adaptable to a wide variety of situations and applications. This is accomplished by appropriate material selection, configuration and dimensioning of the bimetallic element. In one preferred embodiment of the optical isolator of the present invention, the bimetallic element has a generally curved portion which generally circumscribes the analyzer. Of course, other shapes and configurations may also be employed with efficacy, as required or desired, giving due consideration to the goal of optimally enhancing the isolation performance of the optical isolator over a given range of temperatures. Also, the bimetallic element can be used to house a variety of polarization elements and to provide temperature compensation in other optical devices. For example, the bimetallic element may be used in conjunction with a half-wave plate or it may be used in combination with an external modulator, to achieve some or all of the benefits and advantages disclosed herein.

Advantageously, the optical isolator of the present invention provides a significant improvement over conventional single stage isolators by essentially eliminating the effects of temperature on isolation. It is effective in maintaining a consistent optical isolation over an extended temperature range thereby, allowing the optical device to function without costly active temperature control. The isolator of the present invention also provides several advantages over conventional double-stage or cascaded isolators. Desirably, it is lower in cost, simpler in design, dimensionally smaller, is easier to manufacture, and provides a shorter optical path. This simplicity and compactness render the isolator of the present invention a viable choice for providing temperature compensation in a wide variety of optical devices. The size of the isolator allows it to readily fit into standard optical packages. Additionally, the simple construction of the isolator make it a practically effortless retrofit into conventional opto-electronic packages. Also, advantageously, the isolator of the present invention is environmentally stable and is well suited for the present and future in the field of telecommunications.

The present invention also prescribes, in accordance with one embodiment, a preferred method of manufacturing sub-assemblies of optical elements, such as in one embodiment the temperature compensated optical isolator. Preferably, the method utilizes lamination or layering of sheets with arrays of micro-frames to form an array of optic-receiving micro-fixtures. The micro-frames are, preferably, photo-chemically etched or stamped into the sheets and are supported by tab members. Appropriate optical elements are inserted into the micro-fixtures as dictated by the particular application. The laminate units or pallets which accommodate the array of optical elements are stacked, aligned and attached to form an array of optical assemblies in a laminate stack. A base member may be attached to the optical assemblies to facilitate their mounting. The optical assemblies are removed from the laminate stack by conventional trimming methods.

Advantageously, such a method is well suited for the automated manufacturing of optical assemblies and results in high speed, high volume production, thereby desirably maintaining low manufacturing costs. For example, the method can be used in combination with conventional pick-and-place type of robotics. The present method provides an improvement over conventional manufacturing of optical assemblies which typically utilizes a laborious, time-consuming and costly machining process.

Advantageously, the method can be customized to form or assemble a wide variety of optical components and other small components, and is adaptable to a wide range of applications. For example, the method may be used to mount lenses, crystals, gratings, filters, fibers and various sub-assemblies, among others.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 3 is a schematic illustration of a temperature compensated optical isolator constructed in accordance with one preferred embodiment of the present invention;

FIG. 7A is a schematic drawing illustrating the pass-direction operation of the isolator of FIG. 3, at an optimized temperature;

FIG. 7B is a schematic drawing illustrating the blocking-direction operation of the isolator of FIG. 3, at an optimized temperature;

FIG. 14A is an exploded perspective view illustrating a preferred step of laminating the sheets of FIG. 11;

FIG. 14B is a perspective view of the laminate unit (pallet) formed by the step of FIG. 14A;

FIG. 15A is an exploded perspective view of a preferred micro-fixture formed by the step of FIG. 14A;

FIG. 15B is a perspective view of an assembled micro-fixture formed from the components of FIG. 15A;

FIG. 15C is a perspective view of the micro-fixture of FIG. 15A in combination with an optical element;

DETAILED DESCRIPTION OF THE PREFERRED EMBODIMENTS

Figure 1A:
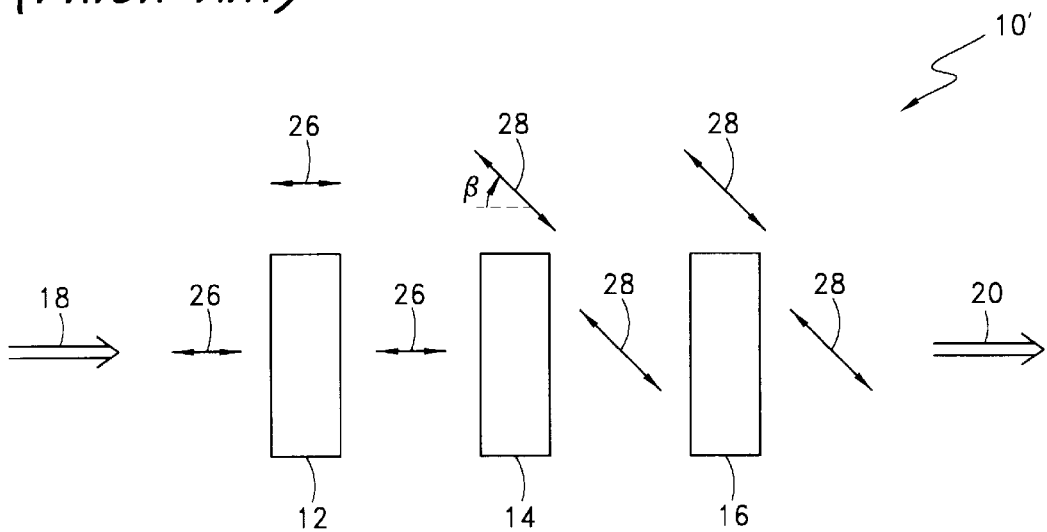
FIG. 1A is a schematic drawing illustrating the pass-direction operation of a conventional optical isolator, as known in the art.
Figure 1B:
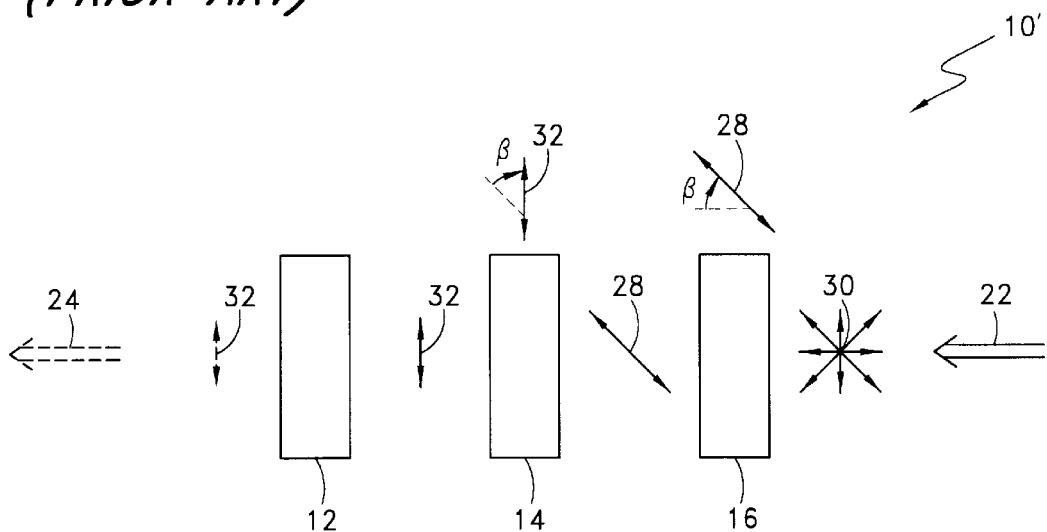
FIG. 1B is a schematic drawing illustrating the blocking-direction operation of the isolator of FIG. 1A.

FIGS. 1A and 1B schematically illustrate the operating principle of a conventional optical isolator 10', as is well known in the art. The isolator 10' includes a polarizer (polarizing element) 12, a Faraday rotator 14 and an analyzer (polarizing element) 16. In the pass (forward) direction, as illustrated in FIG. 1A, the optical isolator 10' permits the incident light 18 to be transmitted through it resulting in a beam of transmitted light 20. In the blocking (reverse) direction, as illustrated in FIG. 1B, the isolator 10' ideally blocks all or most of the back-reflected light 22, while operating at the optimized temperature, so that the reflection-induced light 24 passing through the isolator 10' is essentially none or negligible.

As illustrated in FIG. 1A, in the pass (forward) direction, incident light 18 passes through the polarizer 12 without obstruction since its plane of polarization 26 coincides with the axis of polarization of the polarizer 12. The Faraday rotator 14 rotates the plane of polarization 26 of the incident light 18 by an angle $\beta=45°$, in a clockwise direction, so that the light that is transmitted through the Faraday rotator 14 has a plane of polarization 28. Since the axis of polarization of the analyzer 16 is oriented the same as the plane of polarization 28, all or most of the light incident on the analyzer 16 passes through it as transmitted light 20.

In the blocking (reverse) direction, as illustrated in FIG. 1B, the back-reflected light 22 of arbitrary polarization 30 is incident on the analyzer 16 which transmits some of this light and polarizes it to a plane of polarization 28 that matches the analyzer axis of polarization. Of course, the plane of polarization 28 of the reflected light 22 will be oriented at 45° (clockwise) with respect to the plane of polarization 26 of the incident light 18 (FIG. 1A). The Faraday rotator 14 rotates the plane of polarization 28 of the reflected light 22 by an angle $\beta=45°$, again in a clockwise direction. Therefore, the plane of polarization 32 of the back-reflected light 22 that is transmitted through the Faraday rotator 14 is oriented at 90° with respect to the plane of polarization 26 of the incident light 18 and is, hence, perpendicular to the axis of polarization of the polarizer 12. This ideally blocks all or most of the back-reflected light 22 so that the reflection-induced light 24 passing through the polarizer 12 is essentially none or negligible. In this manner, the optical isolator 10' is used to transmit light 18 from a source, such as a laser (not shown) in the pass (forward) direction and essentially extinguish any reflected light 22 in the blocking (reverse) direction.

This extinguishing effect is commonly known as "isolation". Referring to the blocking (reverse) direction shown in FIG. 1B, the isolation is defined as the amount of unpolarized light incident on the analyzer 16 that passes through the polarizer 12. The effective transmission, $\tau$, through a polarization element can be defined as:

$$\tau = k_1 \cos^2(\phi) + k_2 \sin^2(\phi) \tag{1}$$

where, $k_1$ is the maximum transmission of polarized light through the polarizing element, $k_2$ is the minimum transmission of polarized light through the polarizing element, and $\phi$ is the angular offset between the plane of polarization of the polarized light and the axis of polarization of the polarization element. When $\phi=0°$, that is when the plane of polarization of the polarized light coincides with the axis of polarization of the polarization element, the transmission through the polarization element will be maximum and given by $\tau=k_1$. When $\phi=90°$, that is when the plane of polarization of the polarized light is perpendicular to the axis of polarization of the polarization element, the transmission through the polarization element will be minimum and given by $\tau=k_2$.

Of course, $k_1$ and $k_2$ are generally dependent on the characteristics of the particular polarizing element, as is well known in the art. For example, typically, $k_1$ is about 0.98 and $k_2$ is about 0.000098 for high contrast POLARCOR™ polarizers from Corning, Inc. of Corning, N.Y. To illustrate the effect of temperature on the isolation performance of the optical isolator 10' (FIGS. 1A and 1B) it is assumed that the polarizer 12 and the analyzer 16 are POLARCOR™ polarizers with $k_1=0.98$ and $k_2=0.000098$, and that there is no transmission loss through the Faraday rotator 14.

Referring to FIG. 1B, and using equation (1), the effective transmission, $\tau_{16}$, of the unpolarized reflected light 22 with arbitrary polarization 30 through the analyzer 16 is given by:

$$\tau_{16} = k_1 \cos^2(\phi) + k_2 \sin^2(\phi) = \frac{1}{2}(k_1 + k_2) \tag{2}$$

since, the average value of $\cos^2(\phi)$ and $\sin^2(\phi)$, over $0° \leq \phi \leq 360°$, is ½. As mentioned above, the light that is transmitted through the analyzer 16 is linearly polarized by the analyzer 16.

Referring to FIG. 1B, after the plane of polarization of the polarized reflected light has been rotated by the Faraday rotator, the rotated polarized light is incident on the polarizer 12. Using equation (1), the effective transmission, $\tau_{12}$, of the polarized reflected light with plane of polarization 32 through the polarizer 12 is given by:

$$\tau_{12} = k_1 \cos^2(\phi) + k_2 \sin^2(\phi) = k_1 \cos^2(90°) + k_2 \sin^2(90°) = k_2 \tag{3}$$

since, the plane of polarization 32 is perpendicular to the axis of polarization of the polarizer 12.

The isolation transmission, $\tau_{ISO}$, through the optical isolator 10' (see FIG. 1B), neglecting any loss through the Faraday rotator 14, is:

$$\tau_{ISO} = \tau_{16} \tau_{12} \tag{4}$$

The degree or amount of isolation, I, of the optical isolator 10' can also be represented in terms of deciBels (dB) by:

$$I = -10 \log(\tau_{ISO}) \tag{5}$$

It is desirable to have a high isolation, typically at least about 40 dB, so that reflection induced noise due to the optical isolator is minimized in the optical device, such as a laser.

For POLARCOR™ polarizers, with $k_1=0.98$ and $k_2=0.000098$, $\tau_{16}$ is 0.490049 using equation (2), $\tau_{12}$ is 0.000098 using equation (3), so that the isolation transmission, $\tau_{ISO}$, is $4.8024802 \times 10^{-5}$ from equation (4). Thus, using equation (5) the isolation, I, is 43.185 dB, thereby effectively extinguishing transmission of most back-reflected light through the optical isolator. Of course, this analysis neglects the effect of any Faraday rotator temperature variations and assumes optical isolator operation at an optimum temperature, typically 25° C.

As mentioned above, each Faraday rotator has a temperature coefficient of rotation. Thus, changes in temperature influence the magnitude of Faraday rotation and can undesirably lead to degradation in isolation performance. For example, if the temperature of the Faraday rotator (FIGS. 1A and 1B) changes from the optimum operating temperature, the plane of polarization 32 (FIG. 1B) of the back-reflected light incident on the polarizer 12 will be offset somewhat from the desired 90°. This will result in an increase in the effective transmission $\tau_{12}$ of reflected light back through the polarizer 12, and hence, an increase in the noise or isolation transmission $\tau_{ISO}$ and a corresponding undesirable decrease in the isolation, I, of the optical isolator 10'.

Figure 2A:
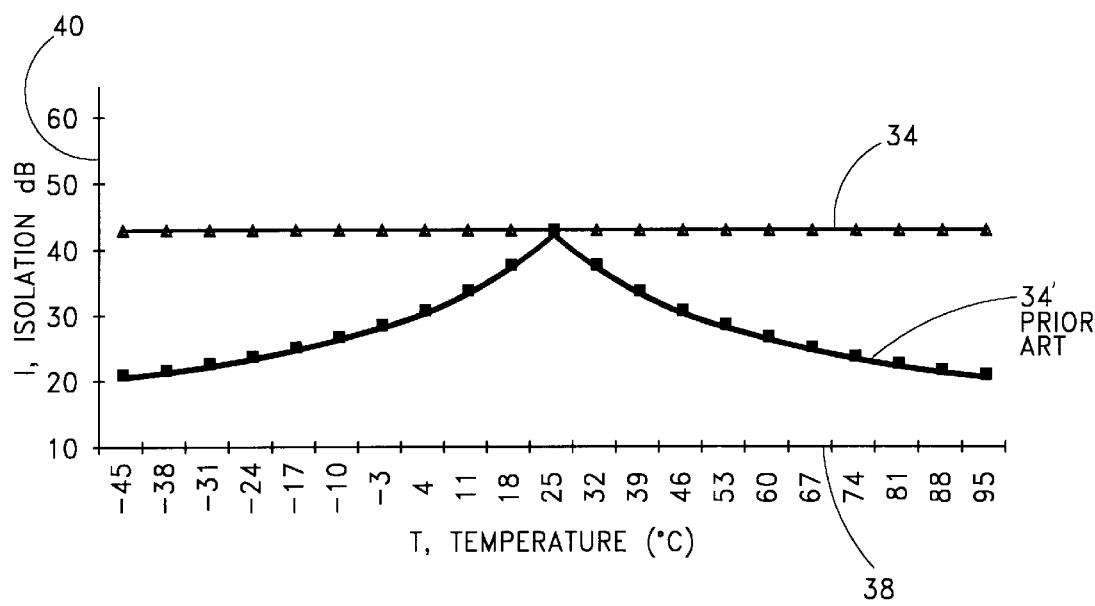
FIG. 2A is a graphical comparison of the theoretical isolation performances, as a function of temperature, between the isolator of FIG. 1 and one preferred embodiment of the isolator of the present invention.
Figure 2B:
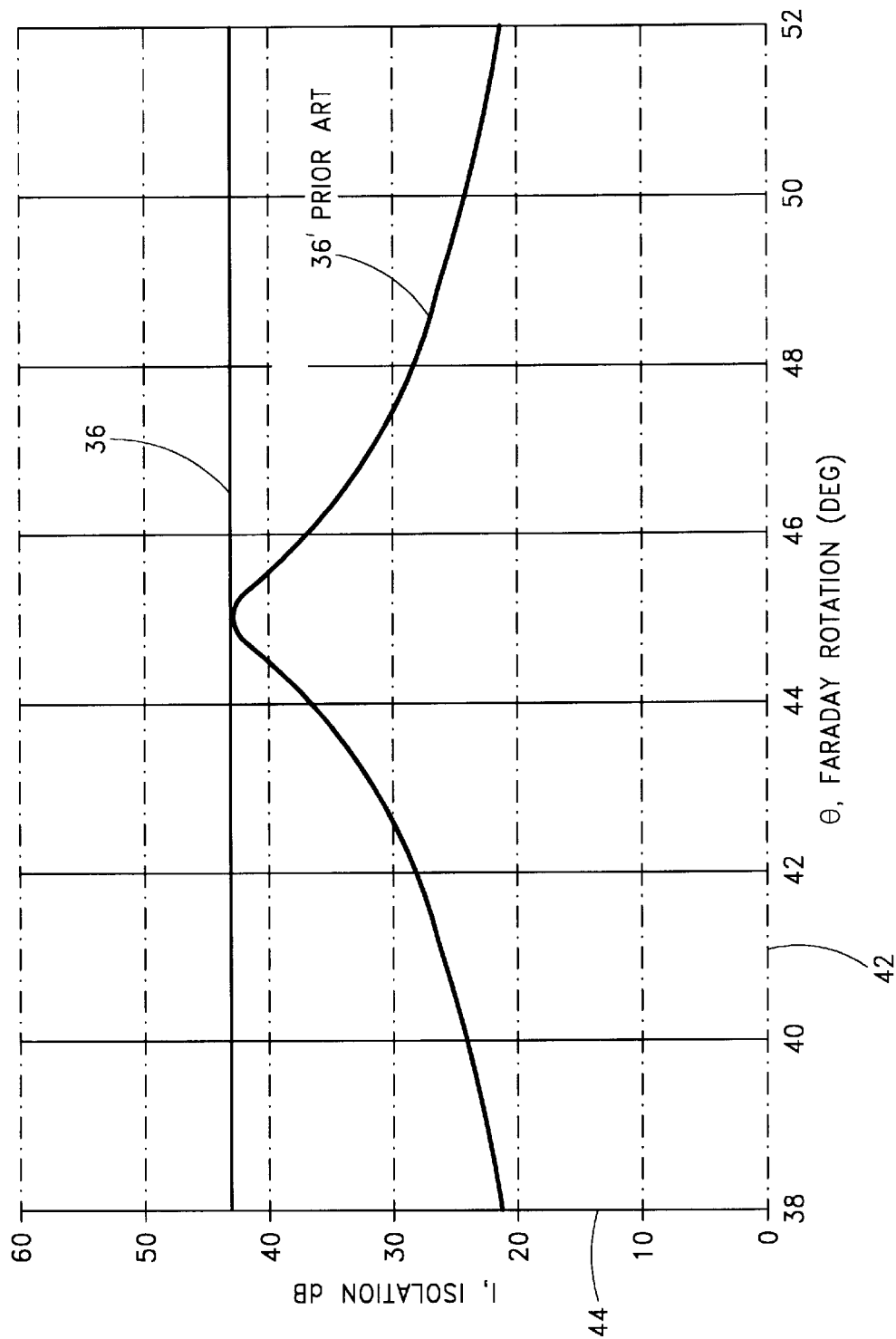
FIG. 2B is a graphical comparison of the theoretical isolation performances, as a function of Faraday rotation, between the isolator of FIG. 1 and one preferred embodiment of the isolator of the present invention.

This effect of temperature on the isolation of the optical isolator 10' (FIGS. 1A and 1B), calculated by using equations (1) to (5), is illustrated in FIGS. 2A and 2B by respective curves 34' and 36'. For illustration purposes, it is assumed that the Faraday rotator temperature coefficient of rotation, $C_{ROT}$, is $-0.1°/°$ C.

The graph of FIG. 2A shows the effect of temperature on the isolation with the x-axis 38 representing the temperature and the y-axis 40 representing the amount of isolation, I. As can be seen by curve 34' in FIG. 2A, the isolation of the optical isolator 10' (FIGS. 1A and 1B) is a maximum at the optimum operating temperature of 25° C. But, as the temperature varies from 25° C., the isolation, undesirably, drops sharply. Referring to curve 34', a temperature variation of about 70° C. causes a drop of more than 20 dB in the amount of isolation. This represents an almost 150-fold increase in the amount of back-reflected noise, $\tau_{ISO}$, admitted into the optical circuit.

The graph of FIG. 2B shows a similar effect on the isolation in terms of the rotation, θ, through the Faraday rotator (FIGS. 1A and 1B) with the x-axis 42 representing the Faraday rotation and the y-axis 44 representing the amount of isolation. As can be seen by curve 36' in FIG. 2B, the isolation of the optical isolator 10' (FIGS. 1A and 1B) is a maximum at the optimum Faraday rotation of 45°. But, as the rotation varies from 45°, due to the temperature variation, the isolation, undesirably, drops sharply. Referring to curve 36', a Faraday rotation variation of about 7° causes a drop of more than 20 dB in the amount of isolation. This represents an almost 150-fold increase in the amount of back-reflected noise $\tau_{ISO}$ admitted into the optical circuit.

The temperature variation will also affect the transmission of light through the isolator 10' in the pass (forward) direction shown in FIG. 1A. The transmission in the pass (forward) direction will be reduced since the light incident on the analyzer 16 (FIG. 1A) will have a plane of polarization that is offset from the axis of polarization of the analyzer, due to the temperature induced variation in Faraday rotation. This transmission loss in deciBels can be determined by using equation (5), and is typically small. Thus, temperature variations, are critical in undesirably degrading the isolation performance of the prior art optical isolator 10', while having a less significant effect on the forward transmission.

Temperature Compensated Isolator

The present invention provides thermal compensation for magneto-optical materials, such as a Faraday rotator, by utilizing the arcing or curling motion of bimetallic metal strips due to their expansion/contraction when exposed to temperature variations. A polarization element is attached to a bimetallic element which allows correction for temperature induced Faraday rotation. The bimetallic element is configured to optimally match the Faraday rotation with the polarization element rotation.

Figure 4A:
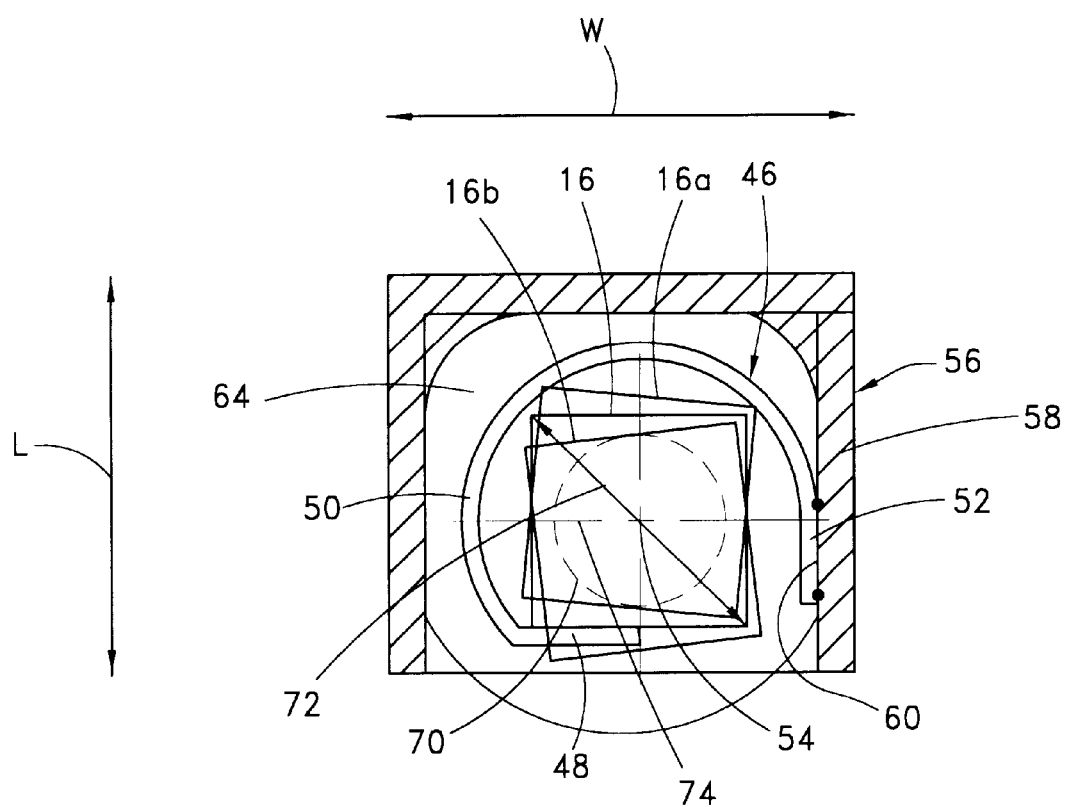
FIG. 4A is a front elevational view illustrating one preferred bimetallic element of the isolator of FIG. 3.

FIG. 3 schematically illustrates one preferred embodiment of a temperature compensated optical isolator 10 including a polarizer or polarization element 12, a magneto-optical element or Faraday rotator 14, and an analyzer or a polarization element 16 which is attached to a bimetallic element 46. FIG. 4A is a detailed front view depicting how the analyzer 16 is attached to the bimetallic element 46. Those skilled in the art will readily comprehend that as the ambient temperature increases or decreases the bimetallic element will expand or contract causing the analyzer 16 to be rotated in a clockwise or counterclockwise direction. The arcing or curling motion of the bimetallic element 46 causes the analyzer 16, and hence its axis of polarization 72, to be rotated about an axis 54 (shown in FIGS. 3, to 6) that is parallel to the direction of propagation of the light incident on the isolator 10 and generally passes through the center of the polarizer 12, Faraday rotator 14 and analyzer 16. This rotation is relative to the axis of polarization 74 of the polarizer 12 and is illustrated in FIG. 4A by the position of the analyzers labeled 16a and 16b. Under optimum temperature conditions, typically 25° C., the axes of polarization 72 and 74 are angularly offset by about 45° and no temperature compensation is required, as discussed above.

Referring to FIG. 4A, preferably, the bimetallic element 46 includes a pair of generally straight portions 48, 52 which are joined by a generally curved portion 50. The analyzer 16 is attached to the bimetallic element straight portion 48 such that the bimetallic element 46 generally circumscribes it while allowing the analyzer 16 to freely rotate as the bimetallic element expands or contracts. Preferably, the analyzer 16 is glued to the bimetallic element 46 utilizing pad-printable B-stageable epoxy #118-03 available from Creative Materials Inc. of Tyngsboro, Mass. Alternatively, the analyzer 16 may be attached to the bimetallic element 46 using EP353-ND epoxy available from Epoxy Technology of Billerica, Mass, Optionally, other types of glues or other attachment means, such as pins, locks, clamps, soldering or brazing among others, may be used with efficacy to affix the analyzer 16 to the bimetallic element 46 giving due consideration to the desired goal of providing a reliable, clean, inert and generally temperature independent attachment. In one preferred embodiment of the present invention the edge of the analyzer 16 is metallized with layers of chromium, nickel and gold using vacuum deposition. This permits the analyzer 16 to be attached to the bimetallic element 46, as illustrated, for example, in FIG. 5, by soldering.

Figure 4B:
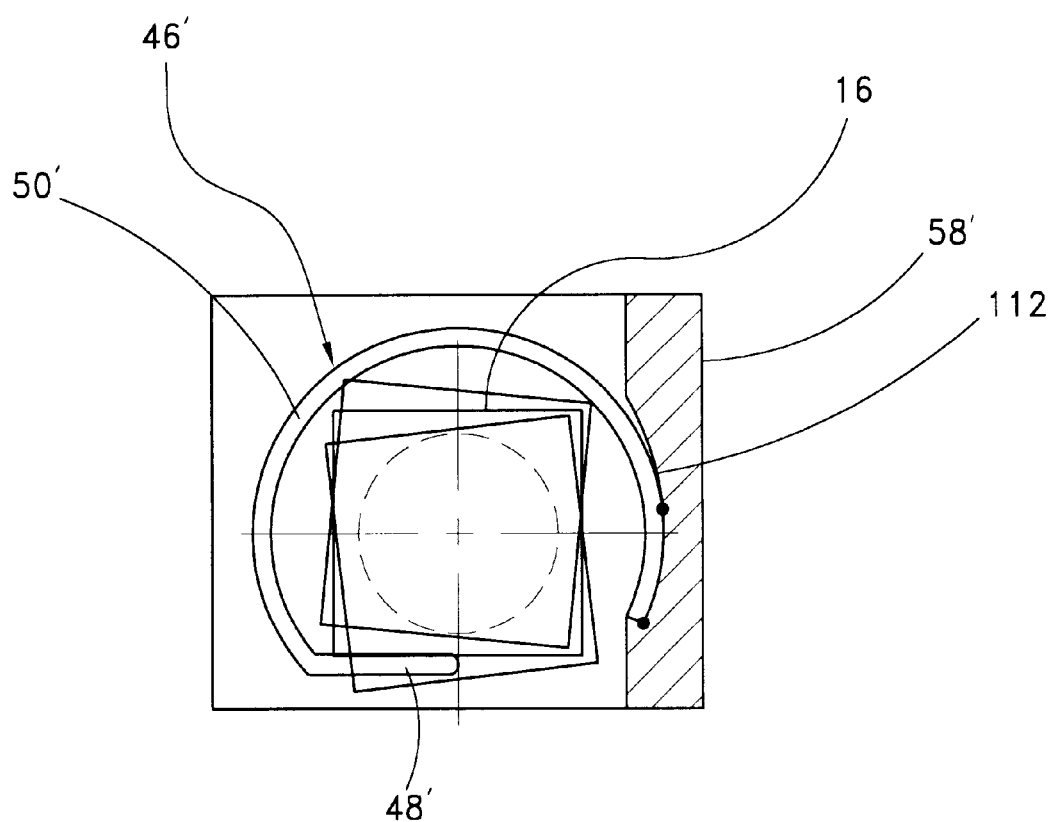
FIG. 4B is a front elevational view illustrating another preferred bimetallic element of the isolator of FIG. 3.
Figure 5:
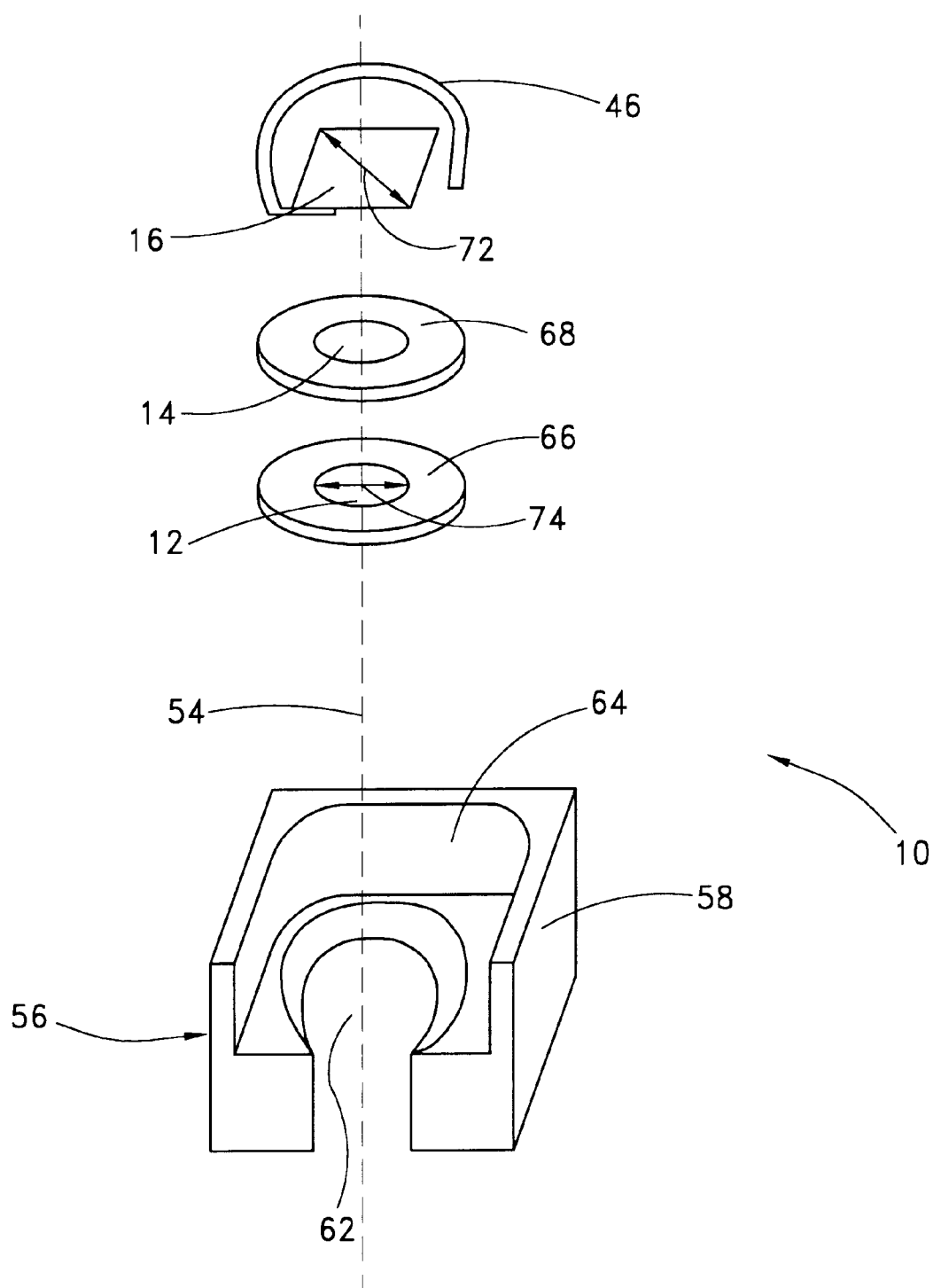
FIG. 5 is an exploded perspective view of the isolator of FIG. 3.

Preferably, and referring to FIGS. 4A and 5, the bimetallic element straight portion 52 is attached to a base or support 56. In one preferred embodiment of the present invention, the base 56 is generally yoke-shaped with a generally U-shaped cavity 64 in communication with a generally circular cavity 62 for housing the polarizer 12 and Faraday rotator 14. Of course, the base 56 can be alternately configured as needed or desired, giving due consideration to the goals of providing a support for the isolator 10 and for permitting the isolator 10 to be readily mounted in optical devices. The bimetallic element straight portion 52 resides inside the cavity 64 and is attached to an inner surface 60 of a wall 58 of the base 56. The flat surface feature of the inner surface 60 facilitates this attachment. Preferably, the bimetallic element straight portion 52 is laser welded to the base 56, though other attachment means, such as resistance welding, soldering or gluing, for example, using epoxy, may be utilized with efficacy. In an alternative embodiment of the present invention, as illustrated in FIG. 4B, a curved portion 50' of a bimetallic element 46' is attached to a groove 112 in a base wall 58' while a flat portion is affixed to the analyzer 16.

Referring particularly to FIG. 5, preferably, the polarizer 12 and the Faraday rotator 14 are mounted in fixtures 66 and 68, respectively, using the B-stageable epoxy. Alternatively, other types of glues, such as the EP353-ND epoxy, or other attachment means, such as pins, locks and clamps among others, may be used with efficacy to affix the polarizer 12 and Faraday rotator 14 to the respective fixtures 66, 68 giving due consideration to the desired goal of providing a reliable, clean, inert and generally temperature independent attachment. The polarizer fixture 66 and the Faraday rotator fixture 68 are configured to fit in the generally circular base cavity 62, and define an aperture 70 (see FIG. 4A) through which light can pass. Advantageously, the optical isolator 10 is configured so that the entire field of view of the aperture 70 lies within the analyzer 16, even when the analyzer 16 rotates to provide temperature compensation. Preferably, the polarizer fixture 66 and Faraday rotator fixture 68 are laser welded to the base 56, though other attachment means, such as resistance welding, soldering or gluing, for example, using epoxy, may be utilized with efficacy. The polarizer fixture 66 and Faraday rotator fixture 68 may also be affixed to one another by one or more of the attachment means discussed above.

Referring to FIGS. 3 to 5, preferably, the polarizer 12 and the analyzer 16 are high contrast POLARCOR™ polarizing elements with a V2 anti-reflecting coating, and are available from Corning Inc. of Corning, N.Y. The particular wavelength or range of wavelengths of the application dictates the selection of the POLARCOR™ element. Preferably, the Faraday rotator 14 is a Latching Garnet Film #L22, which in use does not require an external magnetic field. Such devices are available from Lucent Technologies of Murray Hill, N.J. Again, the wavelength selection is dictated by the requirements of the particular application. The Faraday rotator may be fabricated from a variety of other magneto-optical materials to achieve the benefits and advantages disclosed herein. A non-latching garnet may also be used as the Faraday rotator 14 and the entire isolator assembly housed in a magnet or the magnet may be shaped into a base, such as the base 56. The base 56 is preferably fabricated from stainless steel, though other alloys, metals, plastics and ceramics may be utilized with efficacy, as required or desired. The base 56 may be manufactured by machining, molding, forging or casting. In one preferred form of the present invention, the base 56 may be molded from a high temperature engineering plastic, such as nylon, teflon, polyetheretherketone (PEEK) or phenolic.

Figure 6:
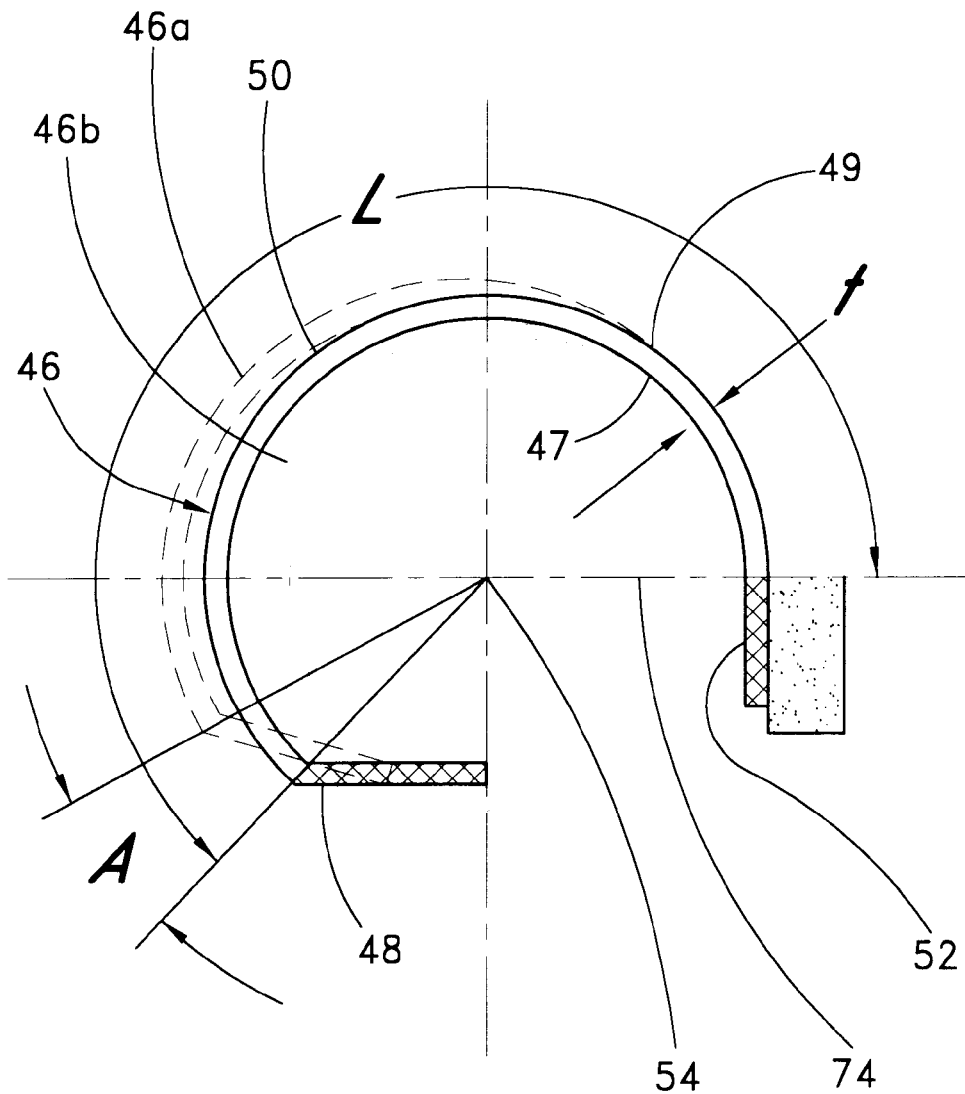
FIG. 6 is a front elevational view illustrating the rotation of the bimetallic element of FIG. 4A.

Referring in particular to FIG. 6, preferably, the bimetallic element 46 is fabricated from ASTM #TM2, available from Atlantic Alloys of Bristol, R.I. In one preferred form of the invention, the ASTM #TM2 has an inner high expansion side (HES) 47 with a 55% layer ratio and a chemical composition of 72 Mn, 18 Cu, 10 Ni, and an outer low expansion side (LES) 49 with a 45% layer ratio and a chemical composition of 36 Ni, 64 Fe (Invar). The ASTM #TM2 is nickel plated for corrosion resistance. In one preferred form of the present invention, this nickel plating also permits the analyzer 16 to be soldered to the bimetallic element 46, as indicated above. Those skilled in the art will readily comprehend that the selection of the bimetallic element 46 is largely dictated by the temperature range of interest, and by the particular configuration and components of the optical isolator 10 and their behavioral variance characteristics over that temperature range. Thus, other types of bimetallic elements with alternate layer ratios and chemical compositions may be used with efficacy, as required or desired, giving due consideration to the goal of providing optimal temperature compensation and maximum isolation.

Referring to FIG. 6, the angular rotation, A, of the bimetallic element 46 is dependent not only on the material specification of the bimetallic element 46, but also on its active length, L, and thickness, t. The angular rotation, A, can be approximated by:

$$A = \frac{67F\Delta TL}{t} \tag{6}$$

where, F is the flexivity of the materials comprising the bimetallic element 46 and $\Delta T$ is the temperature change or variation from the optimum operational temperature, which is typically 25° C. Desirably, the angular rotation, A, is linearly dependent on the temperature change, $\Delta T$, as can be seen from equation (6). Additionally, the temperature coefficient of rotation, $C_{ROT}$, of most Faraday rotator's remains approximately constant as a function of temperature, that is, the change in Faraday rotation is approximately linearly dependent on the temperature change. Advantageously, this permits, by proper selection of the material and dimensions of the bimetallic element 46, the temperature induced change in Faraday rotation to be matched by a generally corresponding angular rotation of the bimetallic element 46. Thus, the analyzer 16 which is attached to the bimetallic element 46, as shown in FIG. 4A, undergoes a corresponding rotation which substantially compensates for undesirable thermally induced back-reflection, as will be discussed at greater length later herein.

In one preferred form of the invention, the optical isolator 10 (shown, for example, in FIG. 5) is dimensioned and configured to optimally compensate for temperature variations in the range of −40° C. (−40° F.) to 85° C. (185° F.). The bimetallic element 46 is ASTM #TM2 as discussed above and its average flexivity is approximately 186×10$^{-7}$ mm/mm/° C. (203×10$^{-7}$ in/in/° F.) in the above temperature range of interest. Those skilled in the art will realize that the flexivity value will also have some temperature dependency. But, advantageously, the deviation in flexivity of ASTM #TM2 from the average value is small. In the above temperature range the flexivity value changes in the range from about +1% to about −6%.

Referring to FIGS. 3 to 6, preferably, the optical isolator 10 is configured so that the respective axes of polarizations 74, 72 of the polarizer 12 and analyzer 16 are angularly offset by 45° at a desired nominal design temperature, such as 25° C. In this optimum configuration, at a temperature of 25° C., the analyzer 16 and the bimetallic element 46 are positioned as illustrated in FIGS. 4A and 6. At 25° C., the curved portion 50 of the bimetallic element 46 defines an included angle of about 218° and has an internal diameter of about 1.905 mm (0.075 inches). The thickness of the bimetallic element is about 0.1016 mm (0.004 inches) and its width is about 0.7874 mm (0.031 inches). With these dimensions, the active length, L, of the bimetallic element 46 is readily calculated to be about 3.81 mm (0.150 inches).

Referring to FIG. 6, as the temperature increases above the optimum temperature of 25° C., the bimetallic element 46 curls outwards or expands as illustrated by the position of the bimetallic element 46a. Using equation (6), at the upper temperature extreme of 85° C. (185° F.), the bimetallic element 46 will undergo an angular rotation, A, of approximately +6° about the axis 54. Referring to FIG. 4A, the analyzer 16 will experience a corresponding rotation of approximately +6° about the axis 54 and relative to the polarizer axis of polarization 74, as illustrated by the position of the analyzer 16a, so that the axes of polarization 72, 74 are angularly offset by about 51°.

Referring to FIG. 6, as the temperature decreases below the optimum temperature of 25° C., the bimetallic element 46 curls inwards or contracts as illustrated by the position of the bimetallic element 46b. Using equation (6), at the lower temperature extreme of −85° C. (−185° F.), the bimetallic element 46 will undergo an angular rotation, A, of approximately −6° about the axis 54. Referring to FIG. 4A, the analyzer 16 will experience a corresponding rotation of approximately −6° about the axis 54 and relative to the polarizer axis of polarization 74, as illustrated by the position of the analyzer 16b, so that the axes of polarization 72, 74 are angularly offset by about 39°.

Referring to FIG. 4A, the analyzer 16 will also be axially displaced as it undergoes temperature induced rotation. It is desirable to optimally reduce this axial displacement. Preferably and advantageously, the components of the optical isolator 10 (FIGS. 3 to 6) are configured so that the entire field of view of the aperture 70 lies within the analyzer 16, even when the analyzer 16 is rotationally and axially displaced to the extreme positions 16a and 16b, shown in FIG. 4A. To accomplish this, in one preferred form, the analyzer 16 is approximately centered on the axis 54 and is generally square shaped with an about 1.27 mm (0.050 inches) side, and the polarizer 12, polarizer fixture 66, Faraday rotator 14, Faraday rotator fixture 68 are configured and dimensioned to provide an aperture 70 that is approximately centered on the axis 54 and is generally circular with a diameter of about 1.016 mm (0.040 inches). In one preferred form of the present invention, the POLARCOR™ polarizer 12 and the POLARCOR™ analyzer 16 are about 200 $\mu$m thick and the Latching Garnet Faraday rotator 14 is about 300 to 500 $\mu$m thick, though those skilled in the art will be aware that the selection of these dimensions is generally wavelength dependent. Referring to FIG. 4A, the base 56 has a length L of about 2.159 mm (0.085 inches), a width W of about 2.489 mm (0.098 inches), and a depth that is selected to accommodate the components of the isolator 10. It will be apparent to those skilled in the art that the scope of the present invention includes alternate configurations and dimensions, as needed or desired, to achieve the benefits and advantages disclosed herein. These alternate configurations and dimensions will at least partly be governed by the application. In particular, the material selection and dimensioning of the bimetallic element 46 can be used to provide temperature compensation for a wide variety of Faraday rotators having varying temperature coefficients of rotation, $C_{ROT}$. Also, the temperature compensation means of the present invention can be used to rotate other components or combination of components of the isolator 10 to achieve the same effect. For example, the polarizer 12 may be rotated, both the polarizer 12 and the Faraday rotator 14 may be rotated, both the polarizer 12 and analyzer 16 may be rotated, or other combinations thereof giving due consideration to the goal of optimally enhancing the isolation performance.

Figure 8A:
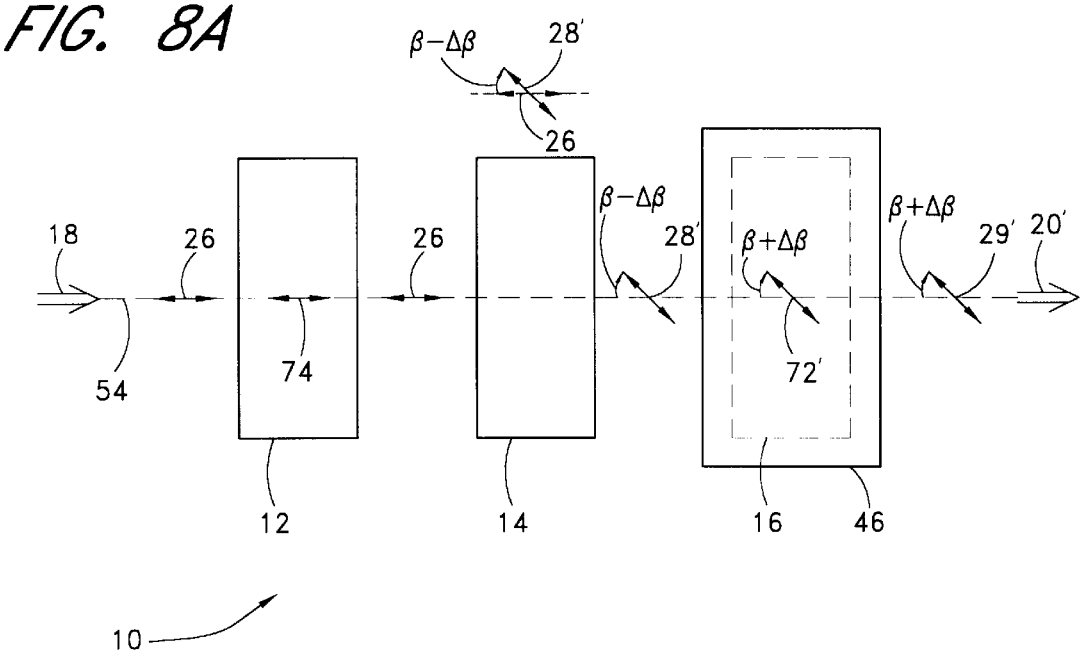
FIG. 8A is a schematic drawing illustrating the pass-direction operation of the isolator of FIG. 3, at a temperature higher than the optimized temperature.
Figure 8B:
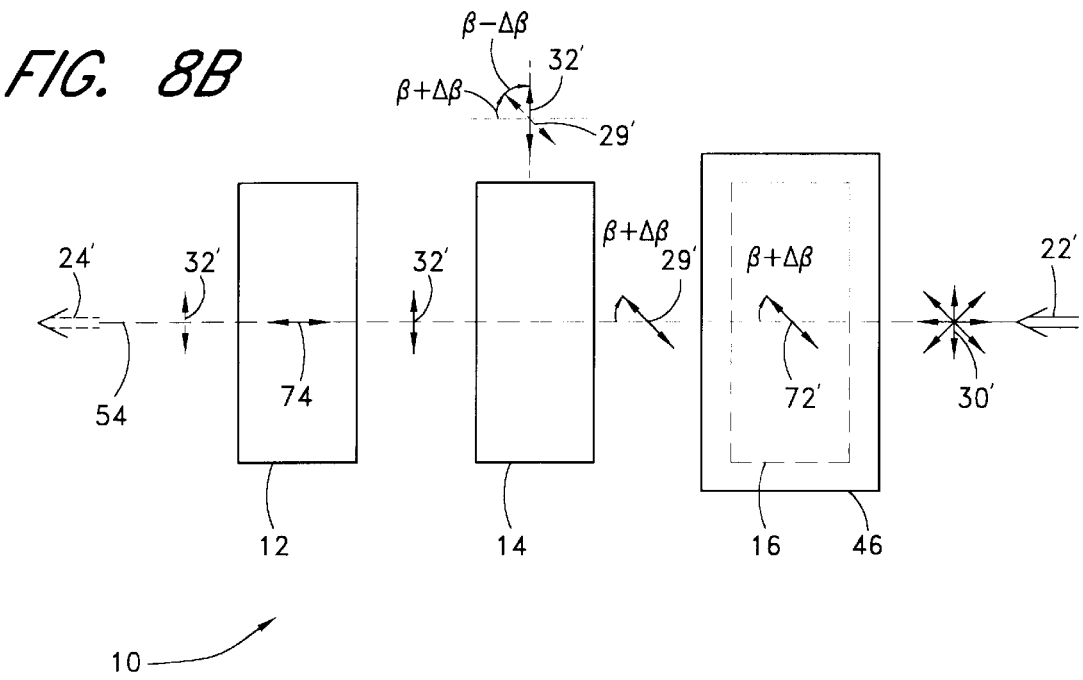
FIG. 8B is a schematic drawing illustrating the blocking-direction operation of the isolator of FIG. 3, at a temperature higher than the optimized temperature.
Figure 9A:
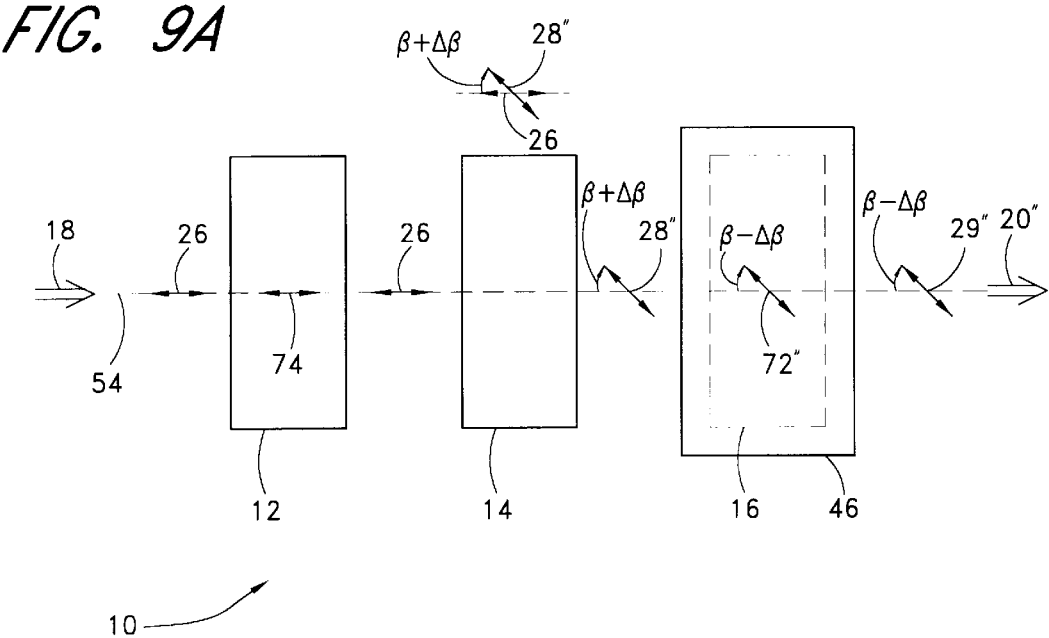
FIG. 9A is a schematic drawing illustrating the pass-direction operation of the isolator of FIG. 3, at a temperature lower than the optimized temperature.
Figure 9B:
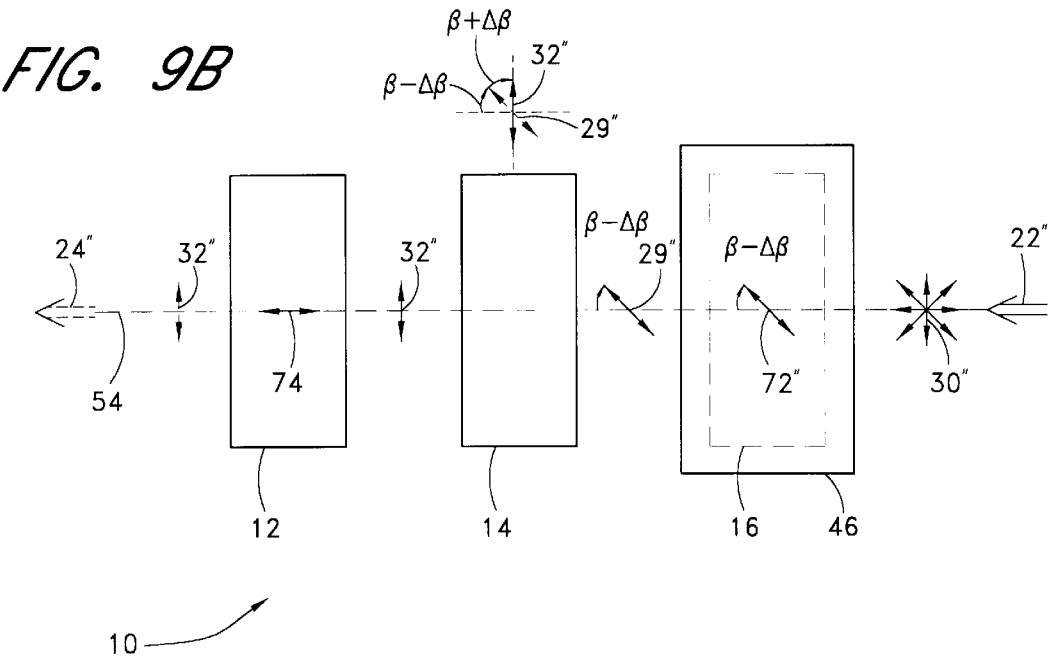
FIG. 9B is a schematic drawing illustrating the blocking-direction operation of the isolator of FIG. 3, at a temperature lower than the optimized temperature.

The operation of the temperature compensated optical isolator 10 is best illustrated by reference to FIGS. 7A to 9B. FIGS. 7A and 7B show the operation of the optical isolator 10 in the pass (forward) direction and in the blocking (reverse) direction, respectively, at an optimized temperature, typically 25° C. This is similar to the operation of the prior art isolator 10' shown in FIGS. 1A and 1B, at the optimized temperature. FIGS. 8A and 8B show the operation of the optical isolator 10 in the pass (forward) direction and in the blocking (reverse) direction, respectively, at a temperature higher than the optimum design temperature. Similarly, FIGS. 9A and 9B show the operation of the optical isolator 10 in the pass (forward) direction and in the blocking (reverse) direction, respectively, at a temperature lower than the optimum design temperature.

As illustrated in FIG. 7A, in the pass (forward) direction at the optimized temperature, the polarized incident light 20 with the plane of polarization 26 is transmitted without obstruction through the polarizer 12 with axis of polarization 74, since the plane of polarization 26 matches the polarizer axis of polarization 74. As the light passes through the Faraday rotator 14, the plane of polarization 26 is rotated by an angle $\beta=45°$ to form the plane of polarization 28. Since the axis of polarization 72 of the analyzer 16 is angularly offset by $\beta=45°$ from the polarizer axis of polarization 74, and thus oriented the same as the plane of polarization 28, all or most of the light incident on the analyzer 16 passes through it as transmitted light 20 with a plane of polarization 29 which is the same as the plane of polarization 28.

In the blocking (reverse) direction at the optimized temperature, as illustrated in FIG. 7B, the back-reflected light 22 of arbitrary polarization 30 is incident on the analyzer 16 which transmits some of this light 22 and polarizes it to a plane of polarization 29 (or 28) that matches its axis of polarization 72. The Faraday rotator 14 rotates the plane of polarization 29 (or 28) by an angle $\beta=45°$ to the plane of polarization 32 which is desirably oriented at $2\beta=90°$ with respect to the axis of polarization 74 of the polarizer 12. Thus, any reflection-induced light 24 passing through the polarizer 12 is essentially none or negligible.

FIGS. 8A and 8B illustrate the operation of the optical isolator 10 at a temperature higher than the optimized temperature. Referring to FIG. 8A, in the pass (forward) direction, the polarized incident light 20 with a plane of polarization 26 is transmitted without obstruction through the polarizer 12 with axis of polarization 74, since the plane of polarization 26 matches the polarizer axis of polarization 74. As mentioned before, the temperature variation affects the rotation of polarized light through the Faraday rotator 14 due to an inherent Faraday rotation temperature coefficient of rotation, $C_{ROT}$. As the light passes through the Faraday rotator 14, the plane of polarization 26 is rotated by an angle $(\beta-\Delta\beta)$ to form the plane of polarization 28', where $\beta=45°$ and $\Delta\beta$ is the temperature induced perturbation to the Faraday rotation. In one preferred form of the invention, $\Delta\beta$ is approximately 6° at a high temperature extreme of about 85° C. (185° F.), so that $(\beta-\Delta\beta)$ is about 51°. Due to the increase in temperature, relative to the optimized temperature, the analyzer 16 attached to the bimetallic element 46 is rotated so that its axis of polarization 72' is angularly offset from the polarizer axis of polarization 74 by about $(\beta+\Delta\beta)$ and from the plane of polarization 28' by about $2\Delta\beta$. As a result, there will be some loss in transmission through the analyzer 16, but this loss is generally small and acceptable, as discussed later. Also, the plane of polarization 29' of the transmitted light 20' will be angularly offset by about $(\beta+\Delta\beta)$ from the polarizer axis of polarization 74 and by about $2\Delta\beta$ from the plane of polarization 28'. This is in contrast to the transmission through the analyzer 16 at the optimum design temperature, as illustrated in FIG. 7A, wherein the light is transmitted with essentially no loss in transmission and the planes of polarization 28 and 29 are essentially the same.

In the blocking (reverse) direction, as illustrated in FIG. 8B, the back-reflected light 22' of arbitrary polarization 30' is incident on the analyzer 16 which transmits some of this light 22' and polarizes it to a plane of polarization 29' that matches its axis of polarization 72'. The light that is incident on the Faraday rotator 14 has a plane of polarization 29' which is oriented at an angle of $(\beta+\Delta\beta)$ with respect to the polarizer axis of polarization 74. The Faraday rotator 14 rotates the plane of polarization 29' by an angle ($\beta-\Delta\beta$). Thus, advantageously, the light that passes through the Faraday rotator 14 has a plane of polarization 32' which is desirably oriented at $2\beta=90°$ with respect to the axis of polarization 74 of the polarizer 12. As a result, any reflection-induced light 24' passing through the polarizer 12 is essentially none or negligible. In this manner, the temperature compensated optical isolator 10 of the present invention, by controlling the relative orientation of the analyzer 16 with respect to the polarizer 12 essentially eliminates all or most of the effect of temperature increases on the performance of the isolator 10.

Similarly, FIGS. 9A and 9B illustrate the operation of the optical isolator 10 at a temperature lower than the optimized temperature. Referring to FIG. 9A, in the pass (forward) direction, the polarized incident light 20 with a plane of polarization 26 is transmitted without obstruction through the polarizer 12 with axis of polarization 74, since the plane of polarization 26 matches the polarizer axis of polarization 74. As the light passes through the Faraday rotator 14, the plane of polarization 26 is rotated by an angle ($\beta+\Delta\beta$) to form the plane of polarization 28", where $\beta=45°$ and $\Delta\beta$ is the temperature induced perturbation to the Faraday rotation. In one preferred form of the invention, $\Delta\beta$ is approximately 6° at a low temperature extreme of about –40° C. (–40° F.), so that ($\beta+\Delta\beta$) is about 45°. Due to the decrease in temperature, relative to the optimized temperature, the analyzer 16 attached to the bimetallic element 46 is rotated so that its axis of polarization 72" is angularly offset from the polarizer axis of polarization 74 by about ($\beta-\Delta\beta$) and from the plane of polarization 28" by about $2\Delta\beta$. As a result, there will be some loss in transmission through the analyzer 16, but this loss is generally small and acceptable, as discussed later. Also, the plane of polarization 29" of the transmitted light 20" will be angularly offset by about ($\beta-\Delta\beta$) from the polarizer axis of polarization 74 and by about $2\Delta\beta$ from the plane of polarization 28". This is in contrast to the transmission through the analyzer 16 at the optimized temperature, as illustrated in FIG. 7A, wherein the light is transmitted with essentially no loss in transmission and the planes of polarization 28 and 29 are essentially the same.

In the blocking (reverse) direction, as illustrated in FIG. 9B, the back-reflected light 22" of arbitrary polarization 30" is incident on the analyzer 16 which transmits some of this light 22" and polarizes it to a plane of polarization 29" that matches its axis of polarization 72". The light that is incident on the Faraday rotator 14 has a plane of polarization 29" which is oriented at an angle of ($\beta-\Delta\beta$) with respect to the polarizer axis of polarization 74. The Faraday rotator 14 rotates the plane of polarization 29" by an angle ($\beta+\Delta\beta$). Thus, advantageously, the light that passes through the Faraday rotator 14 has a plane of polarization 32" which is desirably oriented at $2\beta=90°$ with respect to the axis of polarization 74 of the polarizer 12. As a result, any reflection-induced light 24" passing through the polarizer 12 is essentially none or negligible. In this manner, the temperature compensated optical isolator 10 of the present invention, by controlling the relative orientation of the analyzer 16 with respect to the polarizer 12 essentially eliminates all or most of the effect of temperature degradation in the performance of the isolator 10.

As can be deduced from FIGS. 7B, 8B and 9B, the degree of Faraday rotation at a given temperature in combination with the orientation of the analyzer 16 with respect to the polarizer 12 defines the amount of isolation through the isolator 10. The following equation (7) represents the condition of optimally maximizing the isolation of the optical isolator 10:

$$\beta_{Faraday}(T) + \beta_{Analyzer}(T) = 90° \qquad (7)$$

where, $\beta_{Faraday}$, which is a function of temperature T, is the Faraday rotation at a temperature T and $\beta_{Analyzer}$, which is also a function of temperature T, is the angular offset between the analyzer axis of polarization 72 and the polarizer axis of polarization 74 at the temperature T. Thus, as long as the sum of $\beta_{Faraday}$ and $\beta_{Analyzer}$ is about 90°, the back-reflected light that is incident on the polarizer 12 will have a plane of polarization, for example, the plane of polarization 32' shown in FIG. 8B, that is perpendicular to the polarizer axis of polarization 74. This, advantageously, ensures optimal maximization of isolation of the optical isolator 10.

The optimum theoretical performance of the temperature compensated optical isolator 10 (as shown, for example, in FIG. 5) is illustrated in FIGS. 2A and 2B which also shows the theoretical isolation performance, as discussed before, of the prior art isolator 10' (shown in FIGS. 1A and 1B). For illustration and comparison purposes it is assumed that the Faraday rotator temperature coefficient of rotation, $C_{ROT}$, is about –0.1°/° C. and the polarizer 12 and the analyzer 16 are POLARCOR™ polarizing elements, as described above. Equations (1) to (5) are used to calculate the isolation, I, shown in the graphs of FIGS. 2A and 2B.

The graph of FIG. 2A shows the effect of temperature on the isolation with the x-axis 38 representing the temperature and the y-axis 40 representing the isolation. Curve 34 represents the theoretical isolation of the temperature compensated optical isolator 10 (shown, for example, in FIGS. 3 and 5) while the curve 34' represents the isolation of a conventional optical isolator 10' (shown in FIGS. 1A and 1B). Advantageously, as can be seen by curve 34, the isolation of the optical isolator 10 of the present invention is essentially constant over a temperature range of –45° C. to 95° C. In contrast, and disadvantageously, as can be seen by curve 34', the isolation of the conventional optical isolator 10' drops sharply as the temperature varies from the optimum design temperature of 25° C. The graph of FIG. 2B shows a similar effect on the isolation in terms of the Faraday rotation, $\theta$, with the x-axis 42 representing the Faraday rotation and the y-axis 44 representing the isolation. Curves 36 and 36' represent the isolation of the isolators 10 and 10', respectively.

Figure 2C:
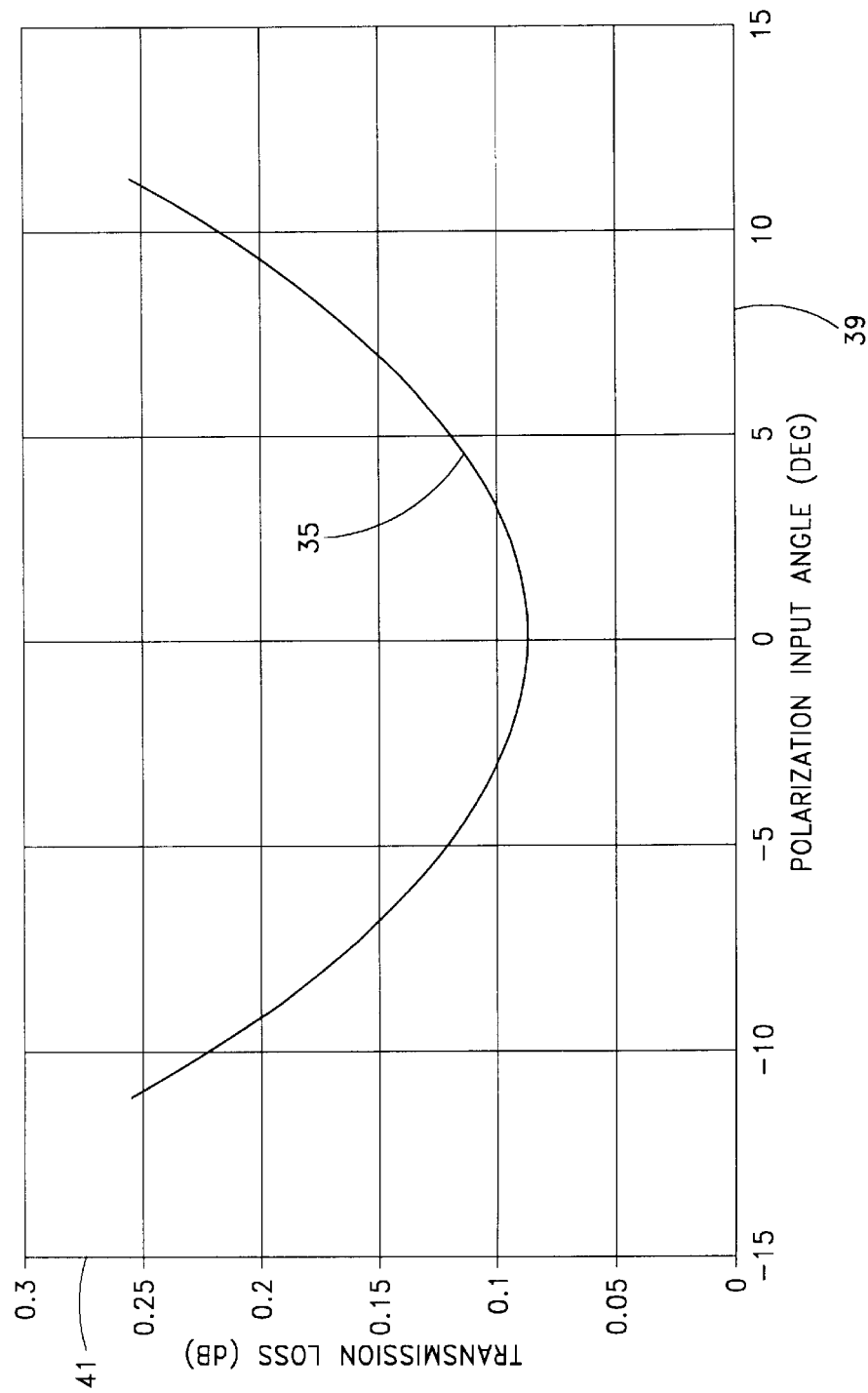
FIG. 2C is a graphical illustration of the theoretical transmission loss through one preferred embodiment of the isolator of the present invention.
Figure 2D:
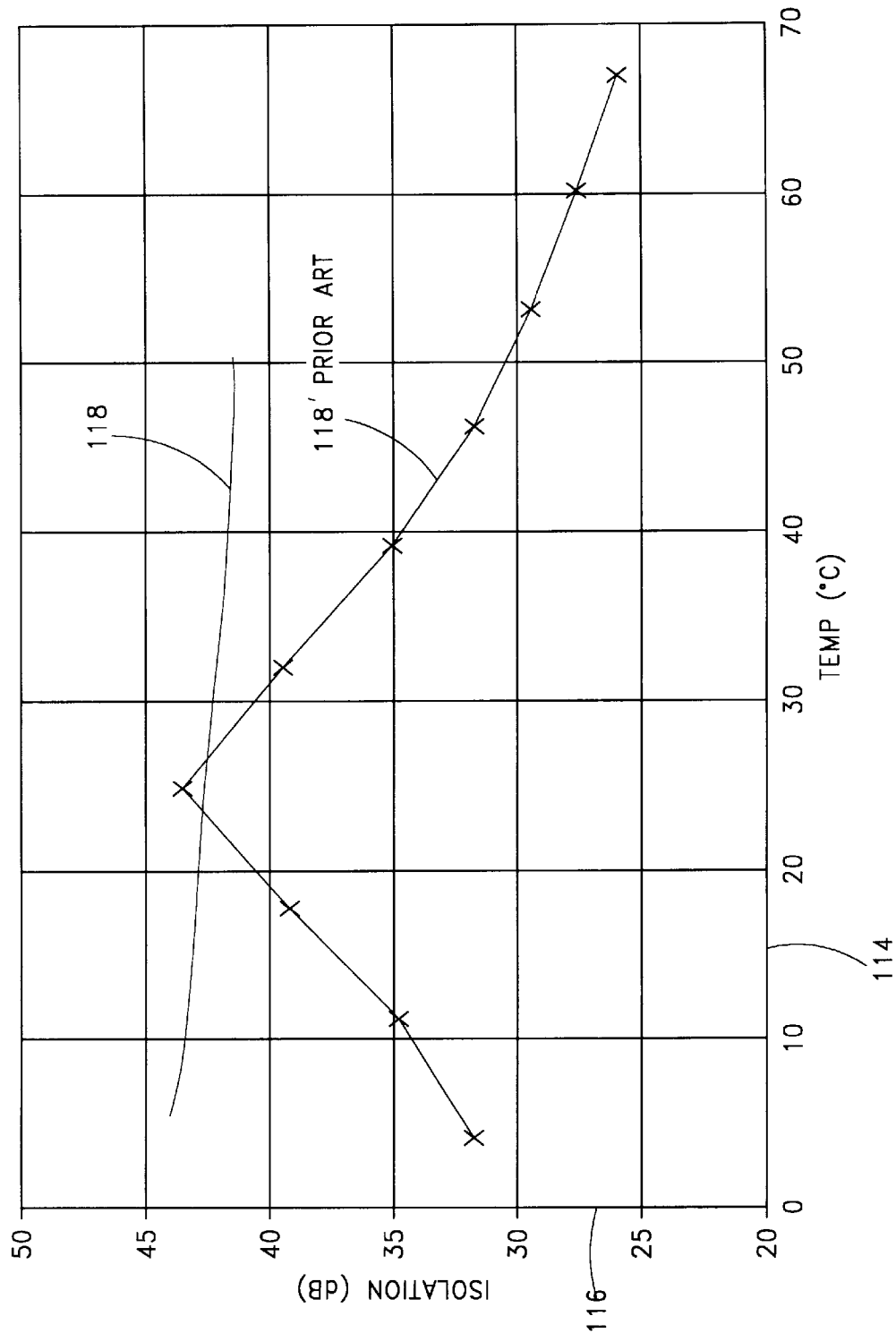
FIG. 2D is a graphical illustration of the experimental isolation performances, as a function of temperature, between the isolator of FIG. 1 and one preferred embodiment of the isolator of the present invention.

FIG. 2D shows an experimental comparison between the isolation performance of a conventional optical isolator 10' (FIGS. 1A and 1B) and the isolator (shown, for example, in FIGS. 3 and 5) of the present invention. Both isolators 10 and 10' include the same optical components but the isolator 10 utilizes the temperature compensation scheme of the present invention. The graph of FIG. 2D shows the effect of temperature on the isolation with the x-axis 114 representing the temperature (in ° C.) and the y-axis 116 representing the isolation (in deciBels). Curve 118 represents the isolation of the temperature compensated optical isolator 10 as extrapolated from measured data while curve 118' represents the measured isolation of a conventional optical isolator 10'. Advantageously, and as the experimental data of FIG. 2D shows, the isolation level of the isolator 10 is generally constant with temperature and close to the accepted value of 40 dB. In contrast, and disadvantageously, the isolation performance of the conventional isolator 10' degrades sharply as the temperature drifts from the nominal design point of 25° C.

Referring in particular to the pass direction shown in FIGS. 8A and 9A, and as mentioned above, the light transmitted through the analyzer 16 will experience some additional loss in transmission. Referring, for example, to FIG. 8A, to compensate for the increase in temperature the analyzer axis of polarization 72' is angularly offset from the plane of polarization 28' by an angle of $2\Delta\beta$, so that the isolation of the optical isolator 10 is optimally maximized (as can be seen in the graph of FIG. 2A). For one preferred form of the invention as described above, at a high temperature extreme of 85° C. the change in Faraday rotation is about 6° so that $2\Delta\beta$ is about 12°. Using equation (1), the analyzer transmission is about 0.94 compared to the optimum transmission at 25° C. of about 0.98. This calculated transmission loss, in deciBels, is shown in the graph of FIG. 2C, by curve 35, with the x-axis 39 representing the input polarization angle and the y-axis 41 representing the transmission loss in deciBels. The loss in transmission at the temperature extremes of 85° C. (polarization input angle= 12°) is only about 0.26 dB. Similarly, the loss in transmission at a low temperature extreme of −40° C. (polarization input angle=−12°) is only about 0.26 dB. Even though this transmission loss is about twice that through the conventional optical isolator 10' (FIGS. 1A and 1B), it is a small loss in forward transmission and is within acceptable limits, given that the isolation performance of the temperature compensated optical isolator 10 is optimally enhanced. Advantageously, the temperature compensated optical isolator 10 permits a small loss in forward transmission to gain a huge improvement in isolation performance.

Advantageously, the optical isolator 10 of the present invention provides consistent and effective optical isolation over an extended temperature, thereby desirably eliminating the need for costly active temperature control. Moreover, the isolator 10 compared to conventional cascaded isolators, is less expensive, has a shorter optical path, is dimensionally smaller, and easier to manufacture. The size of the isolator 10 allows it to readily fit into standard optical packages. Additionally, the simple construction of the isolator 10 make it a practically effortless retrofit into conventional opto-electronic packages. Also, desirably, the present invention provides an isolator 10 that is environmentally stable.

Advantageously, the bimetallic element 46 can be tailored to correspondingly conform to a particular Faraday rotator's temperature coefficient of rotation, by appropriate selection of materials, dimensions and configuration. This adaptability of the bimetallic element 46 adds to the versatility of the isolator 10 and to any other device utilizing the present temperature compensation scheme. The temperature compensation means of the present invention provide a simple yet substantially accurate solution to optimally minimize the temperature induced degradation in performance of optical devices which utilize Faraday rotators.

Temperature Compensation Element

The bimetallic element 46 (see, for example, FIG. 6) can also be used to house other polarization elements. In one preferred embodiment of the present invention, schematically illustrated in FIG. 10, the bimetallic element 46 is attached to a half-wave plate 76. The half-wave plate 10 acts upon incident polarization by rotating its plane of polarization by twice the angle between the plane of polarization and the slow-axis of the wave plate 76, as is known to those skilled in the art. This rotation, $\Omega$, can be represented by:

$$\Omega = 2\phi \quad (8)$$

where, $\phi$ is the angular offset between the plane of polarization of the incident light and the slow-axis of the half wave plate 76.

Figure 10:
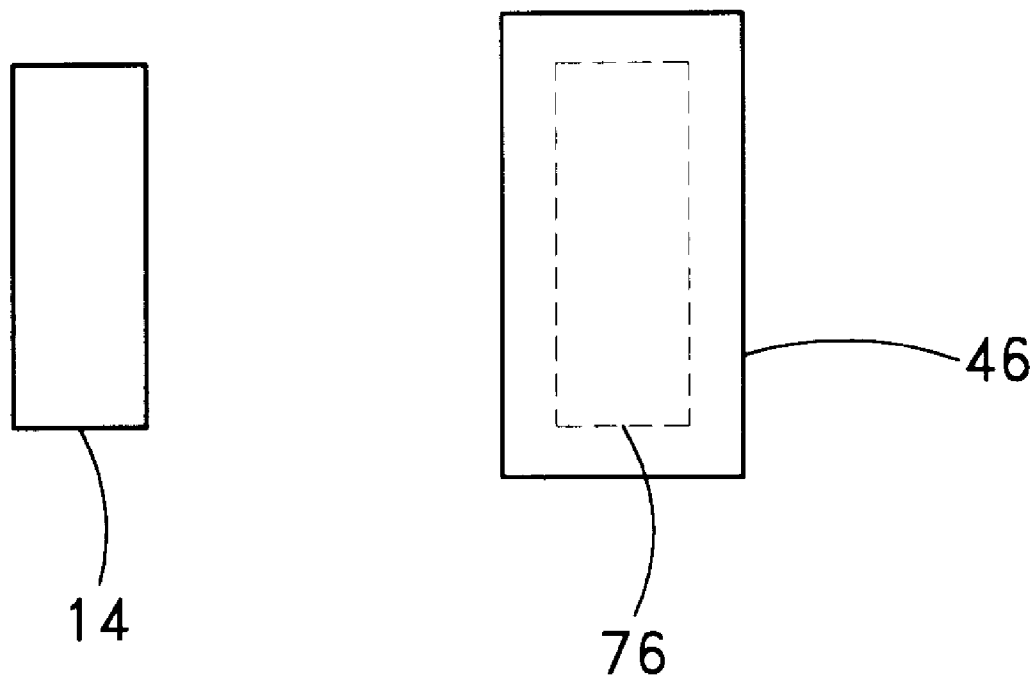
FIG. 10 is a schematic illustration of the bimetallic element of FIG. 3 in combination with a half-wave plate and a Faraday rotator.

Referring to FIG. 10, the half wave plate 76 is often used in combination with a Faraday rotator 14. In the forward direction, this combination can be used to rotate the plane of polarization of incident light by a total of 90°. In the reverse direction, the Faraday rotator 12 and half wave plate 76 combination can be used to rotate this polarization plane by a further 90°, in the opposite direction. In this manner, the plane of polarization of the incident light is essentially rotated by about 0°. Such devices are often used in optical circulators to alter the optical path of light, by causing it to travel in opposite directions, in association with other polarization optics. Of course, the bimetallic element 46 (see, for example, FIG. 6) provides temperature compensation in a manner similar to that discussed above, by adjusting the orientation of the half-wave plate 76 relative to the incident polarized light, thereby ensuring optimal performance.

It will be apparent to those skilled in the art, that the temperature compensation concept of the present invention can be applied to a range of other applications. For example, temperature compensation may be provided for an external modulator in which a Faraday rotator is subject to an alternating magnetic field to alternate the direction of Faraday rotation. Such modulators are used akin to a high-low type of switch. Temperature compensation for the modulator can be provided by housing a polarization element of the modulator in a bimetallic element. By adjusting the axis of polarization of the polarization element the performance of the modulator can be generally improved in-response to temperature variations.

Lamination-based Manufacturing Method

The present invention, in one embodiment, also prescribes a preferred method of manufacturing sub-assemblies of optical elements, such as the temperature compensated optical isolator 10 (shown in, for example, FIG. 5). Preferably, the method utilizes lamination or layering of sheets with arrays of photo-chemically etched micro-frames which are used to house the optics. Advantageously, such a method is well suited for automated manufacturing and results in high speed, high volume production, thereby desirably maintaining low manufacturing costs. The method may be used to mount lenses, crystals, gratings, filters, fibers and sub-assemblies of the same, among others.

Figure 11:
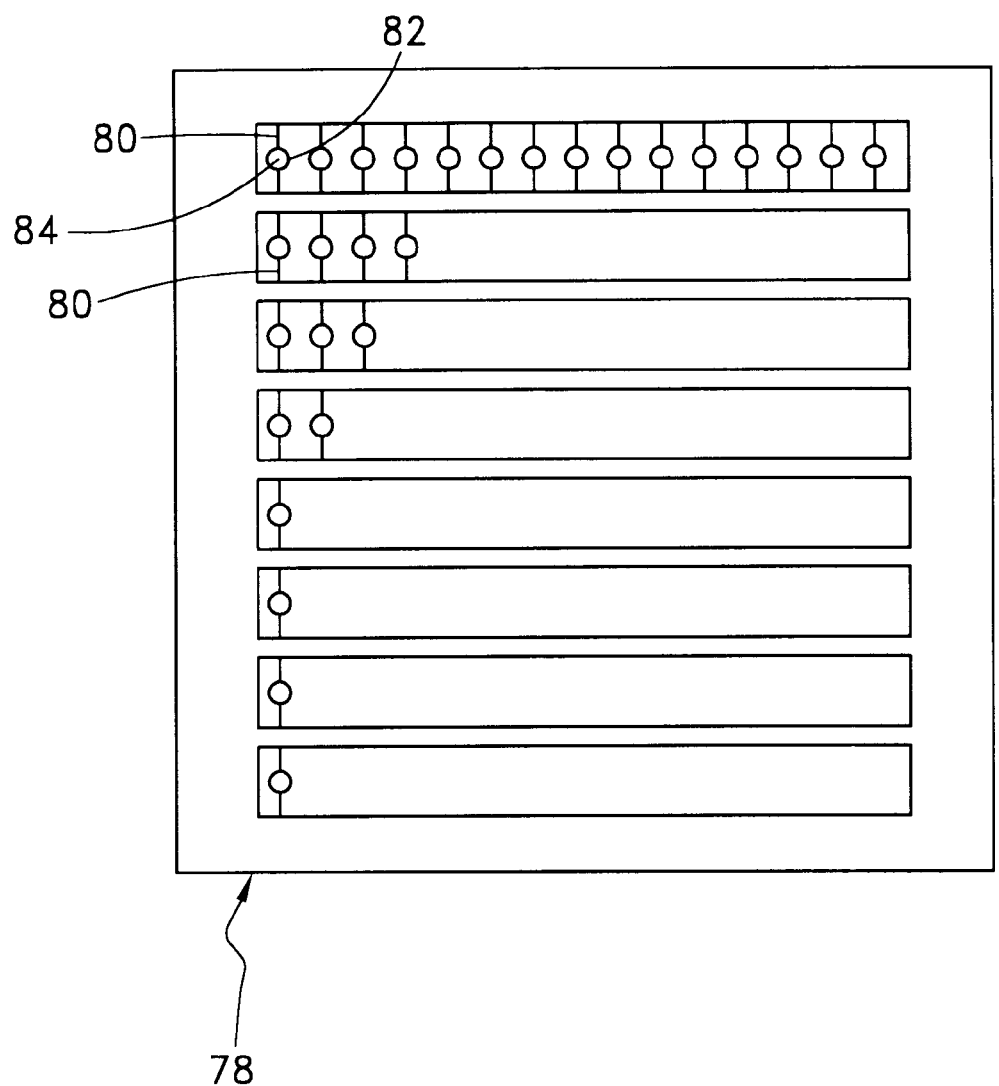
FIG. 11 is a schematic illustration of a micro-framed sheet in accordance with one preferred embodiment of the method of the present invention.
Figure 12A:
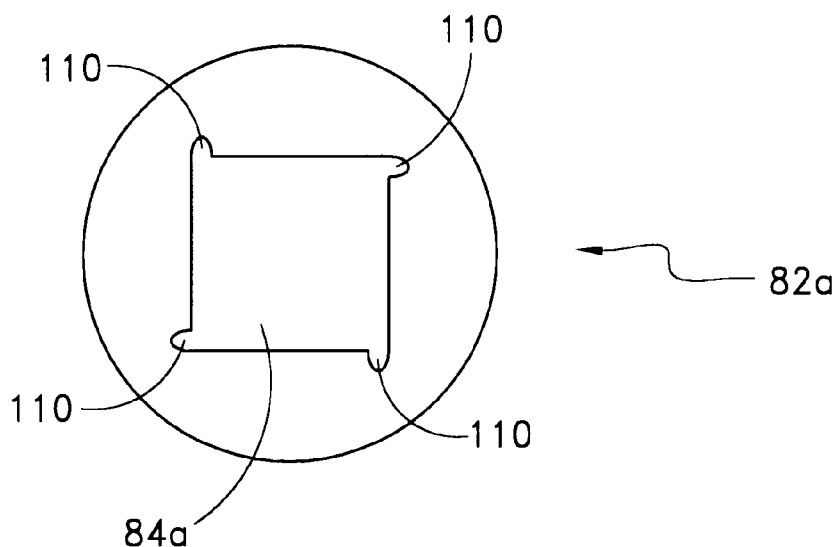
FIG. 12A is a front elevational view of one preferred micro-frame of the sheet of FIG. 11.
Figure 12B:
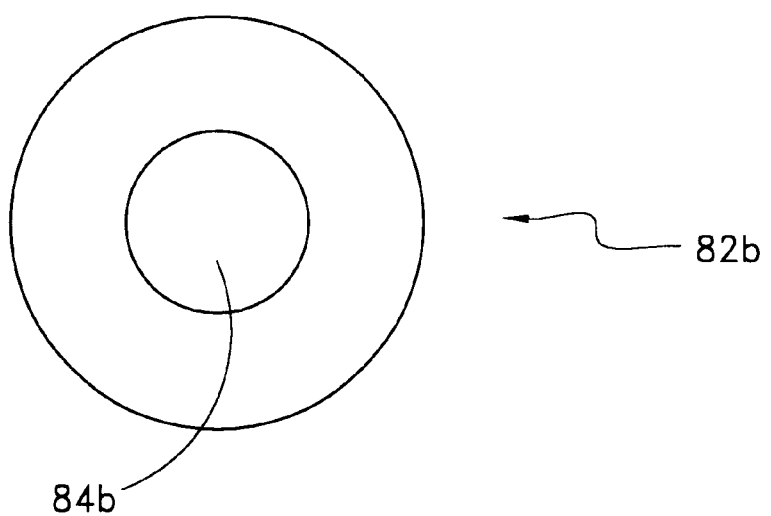
FIG. 12B is a front elevational view of another preferred micro-frame of the sheet of FIG. 11.
Figure 13:
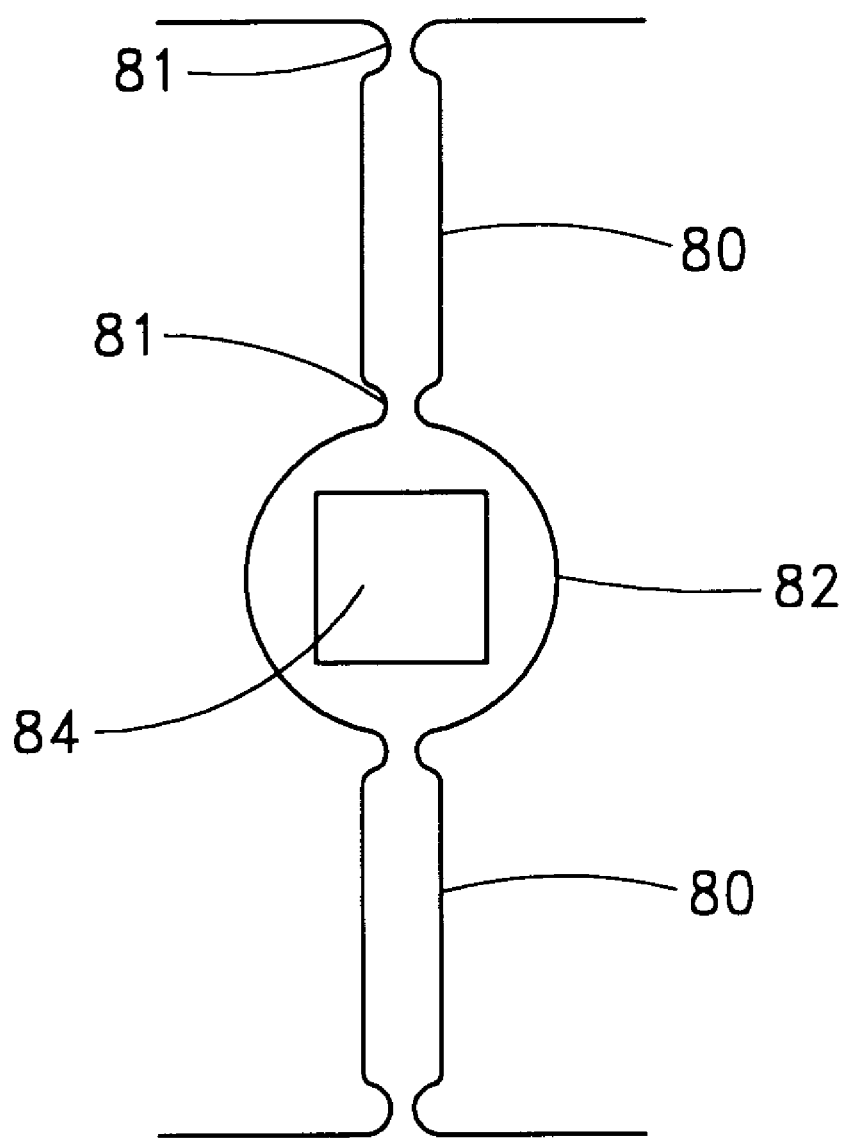
FIG. 13 is a front elevational view showing a preferred pair of tab members of the sheet of FIG. 11.

FIG. 11 illustrates the construction of a preferred sheet 78 which is a building block component in the method of the present invention to manufacture optical assemblies. The sheet 78 includes an array of micro-frames 82 which are, preferably, photo-chemically etched or stamped into the sheet 78. Preferably, each frame 82 is supported by a pair of tabs 80 which are also, preferably, photo-chemically etched or stamped into the sheet 78. Referring to FIG. 13, the tabs 80 are preferably narrowed at the ends 81 to facilitate detachment of the micro-frames 82. Each frame 82 includes a substantially central cavity 84. For a given sheet 78, it is preferred that all the cavities 84 are similarly shaped and dimensioned. Referring to FIGS. 12A and 12B, preferably, the micro-frames 82a include a generally square or rectangular shaped cavity 84a and the micro-frames 82b include a generally circular cavity 84b, respectively. As discussed later herein, a combination of these preferred micro-frames 82a and 82b facilitate the method of the present invention. Of course, the frames 82 may be alternately shaped, as required or desired.

Referring to FIG. 11, the required pattern of photo-chemical etching or stamping is dependent on the application which in turn determines the most suitable dimensional and material specifications of the sheet 78. Appropriate design rules and photo-chemical machining are available from Newcut, Inc. of Newark, N.Y. Those skilled in the art will be aware that the sheet 78 can also be formed using alternative means, such as stamping, laser machining, ultrasonic machining and the like.

Preferably, and referring to FIG. 11, the sheets 78 are fabricated form a metallic material, and more preferably from stainless steel or copper. Of course, other metals, alloys, plastics and ceramics may be utilized with efficacy, as required or desired, to suit the needs of the particular application. Once the required array has been patterned into the sheets 78 (FIG. 11), the sheets 78 are preferably electroplated with an appropriate metal to the proper thickness for brazing. Of course, the electrop-lating need only be applied to those surfaces of the sheets 78 which are to be brazed. Preferably, for stainless steel sheets 78 a 20 microinch (0.508 micrometer) copper plating is applied. Preferably, for copper sheets 78 a 20 microinch (0.508 micrometer) silver plating is applied. Electro-plating services are available from any one of a number of sources well known to those skilled in the art.

Referring to FIGS. 14A and 14B, the electro-plated sheets 78 are aligned and brazed together to form a laminate unit (pallet) 90. The brazing is performed in the appropriate atmosphere or vacuum with applied heat and force. The sheets 78 may also be joined utilizing alternative means, such as welding, soldering and gluing among others, as required or desired. As illustrated in FIGS. 15A to 15D, the alignment and brazing of the sheets 78 results in a layering of the arrays of micro-frames 82 to form optics receiving micro-fixtures 86 each having a cavity 88. Preferably, the sheets 78 are layered such that one or more micro-frames 82a are laminated onto one or more micro-frames 82b which together form the fixture 86. This, advantageously, results in a seat 102 since the generally square cavity 84a (FIG. 12A) is dimensioned to be larger than the generally circular cavity 84b (FIG. 12B). In one preferred form of the present invention, a plastic is molded to form the laminate unit or pallet 90. The mold for such a manufacturing process can be made utilizing a metal laminate pallet and an electroforming process to create a "reverse" master.

Figure 15D:
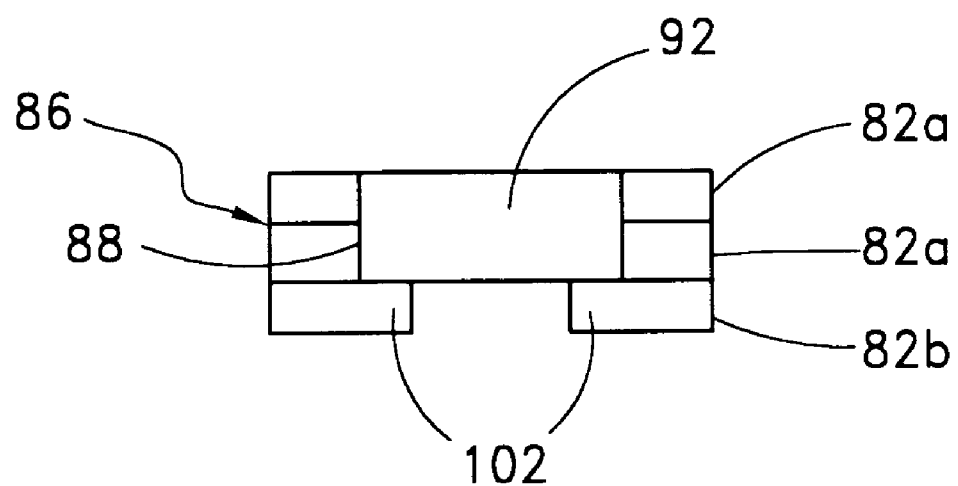
FIG. 15D is a sectional view, taken along line 15D—15D of FIG. 15C.

Referring to FIGS. 14B, 15B, 15C and 15D, an optical element 92 is affixed in each cavity 88 of the array of fixtures 86 of the laminate unit (pallet) 90. As mentioned above, the optical element 92 can include lenses, crystals, gratings, filters, fibers and sub-assemblies of the same, among others. Preferably, the optical elements 92 are attached to fixtures 92 using #118-03 B-stageable epoxy adhesive with 114-20 slow drying thinner available from Creative Materials, Inc. of Tyngsboro, Mass. Typically, a pre-cure is performed to drive off any thinner leaving a tacky surface on the fixture cavity 88. The optical element 92 is inserted, seated on the seat 102, and if needed aligned in the fixture cavity 88. A final cure is performed, by reflowing the B-stageable epoxy so that the optical element 92 is securely attached to the fixture 86, as shown in FIGS. 15C and 15D. Advantageously, the ports 110 (FIG. 12A) of the generally square cavity 84a facilitate the application of epoxy and the square shape of the cavity 84a facilitates alignment, if needed, of the optical element 92. Optionally, other types of glues or other attachment means, such as pins, locks, clamps and solders among others, may be used with efficacy to affix the optical element 92 to the fixture 86 giving due consideration to the desired goal of providing a reliable, clean and inert attachment.

Figure 16A:
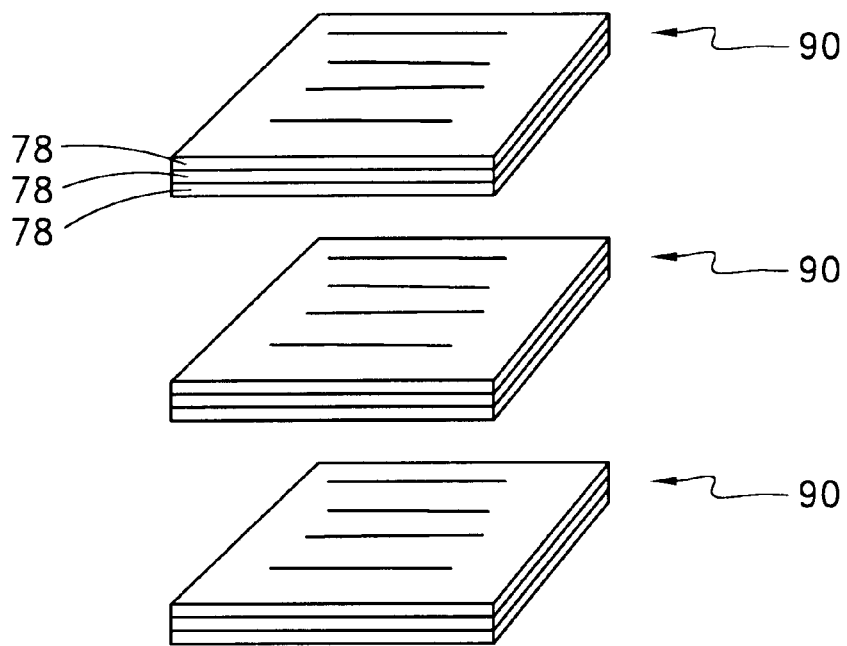
FIG. 16A is an exploded perspective view illustrating a preferred step of laminating the laminate units (pallets) of FIG. 14B.
Figure 16B:
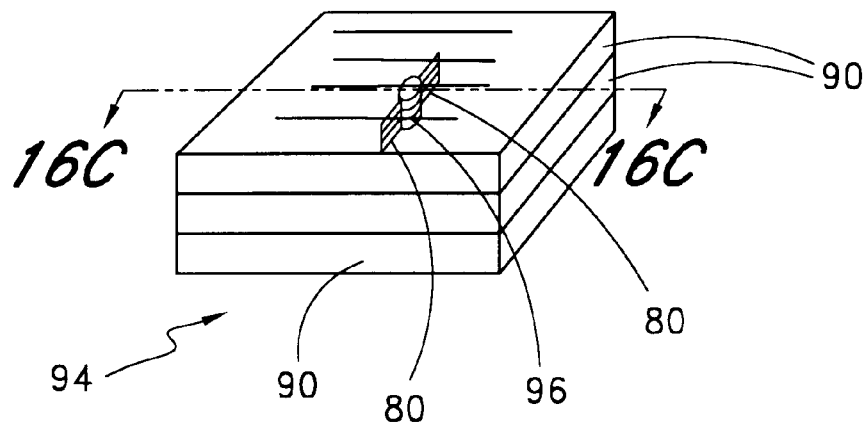
FIG. 16B is a perspective view of the laminate stack formed by the step of FIG. 16A.
Figure 16C:
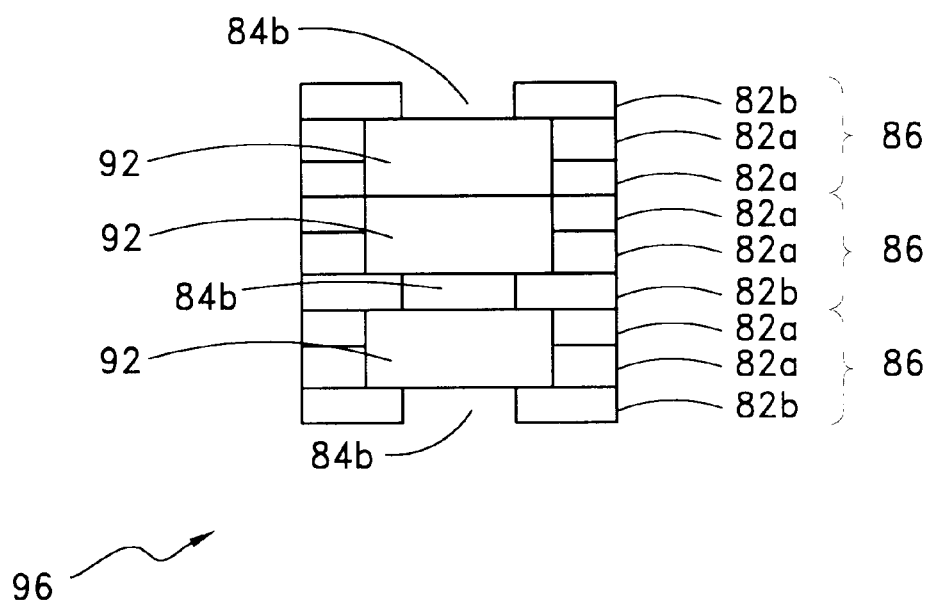
FIG. 16C is a sectional view, taken along line 16C—16C of FIG. 16B.

Referring to FIGS. 16A, 16B and 16C the optics-loaded laminate units (pallets) 90 are aligned and, preferably, clamped to prepare for their attachment. Of course, the laminate units 90 may be stacked in alternate manners, as required or desired, to suit the needs of the particular application. Preferably, the laminate units (pallets) 90 are laser welded to form a laminate stack 94 with an array of optical assemblies 96. Preferably, and as shown in FIG. 16C, the fixtures are stacked such that the generally circular cavities 84b (FIG. 12B) are positioned at either end of the resulting optical assembly 96. Preferably, the welding utilizes a Nd:YAG industrial laser such as available from Unitek-Miyachi Corp. of Monrovia, Calif. Alternatively, the laminate units (pallets) 90 may be attached to one another by resistance welding, soldering and gluing, for example, by using epoxy. In this manner, optical assemblies 96 are created with each optical assembly 96 including one or more optics-loaded fixtures 86 attached to one another. Advantageously, all functional testing of the optical assemblies 96 can be performed in this array format while the assemblies 96 are still part of the laminate stack 94. Of course, the number of optical elements 92 comprising each optical assembly 96 is dependent on the particular application. This in turn determines the number of laminate units 90 (pallets) included in a laminate stack 94.

The optical assemblies 96 (FIGS. 16B and 16C) can then be removed from the laminate stack 94 by conventional trimming methods, such as punching, shearing or stamping. Optionally, only a portion or portions of the laminate stack 94 may be removed by punching, shearing or stamping, as required or desired. This permits additional elements to be added to a selected portion or portions of the laminate stack 94.

Figure 17:
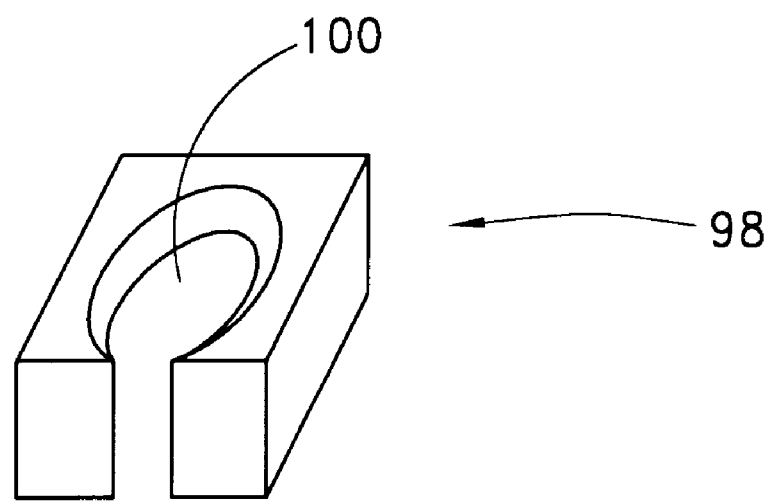
FIG. 17 is a perspective view of a base employed in one preferred embodiment of the method of the present invention.

In one preferred embodiment of the present method, a base 98 (FIG. 17) is used to house the optical assembly 96 (FIG. 16C). Referring to FIG. 16B, one of the pair of set of tabs 80 associated with each optical assembly 96 is removed by punching, shearing or stamping. The base 98 is generally yoke-shaped and has a cavity 100 which is configured and dimensioned to accommodate the fixtures 86 (see FIG. 15C) of the optical assembly 96. Of course, the base 98 can be alternately configured as needed or desired, giving due consideration to the goals of providing a support for the optical assembly 96 and for permitting the assembly 96 to be conveniently mounted in optical devices. Preferably, the base 98 is fabricated from stainless steel though other alloys, metals, ceramics and plastics may be utilized with efficacy. The base 98 may be manufactured by machining, molding, forging or casting. In one preferred form of the present invention, the base 98 is molded from a high temperature engineering plastic. Preferably, the base 98 is laser welded to the optical assembly 96. Preferably, this welding utilizes a Nd:YAG industrial laser as described above. Alternatively, the base 98 may be attached to the optical assembly 96 by resistance welding, soldering and gluing, for example, by using epoxy. In this manner, optical assemblies 96 in combination with a base 98 are created. Advantageously, and as mentioned before, all functional testing and adjusting of the optical assemblies 96 can be performed in this array format while the assemblies 96 are still part of the laminate stack 94. Also, as described above, the optical assemblies 96 (FIGS. 16B and 16C) can then be removed from the laminate stack 94 by conventional trimming methods, such as punching, shearing or stamping.

Referring to FIG. 11, the dimensions and configuration of the etched sheet 78 are dictated by the particular application. In some cases, a sheet 78 with a thickness of about 0.005 inches (0.127 mm) and a generally square shape with an about 4 inches (0.1016 m) side is preferred. The array size of the micro-frames 82 can be selected, as required or desired. In some cases, an array of frames 82 comprising 8 rows with 16 frames 82 in each row is preferred. The dimensioning and configuration of the frames 82 is dependent on the particular optical elements 92 (FIG. 15C) utilized. In one preferred form, the outer diameter of the frames 82a (FIG. 12A) and 82b (FIG. 12B) is about 2.108 mm (0.083 inches), the generally square cavity 84a (FIG. 12A) has sides of about 1.422 mm (0.056 inches), and the generally circular cavity 84b (FIG. 12B) has a diameter of about 1.041 mm (0.041 inches). The number of sheets 78 in each laminate unit 90 (pallet) is dependent on the thickness of each sheet 78 and that of the optical element 92. Similarly, the number of laminate units (pallets) 90 forming a laminate stack 94 is dictated by the particular application and hence the components of the optical assembly 96.

Figure 18:
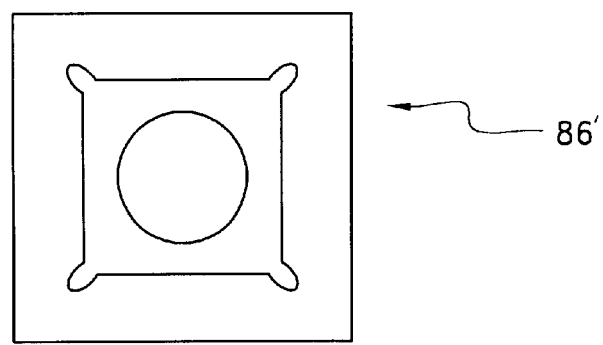
FIG. 18 is a front elevational view of another preferred fixture formed by the step of FIG. 14A.

FIGS. 12A and 12B, have illustrated etched micro-frames 82a and 82b, respectively, with a substantially circular outer perimeter. This forms a fixture 86 (FIG. 15B) with a substantially circular outer perimeter. This shape is generally preferred for coaxial type of optical applications, though other shapes may be utilized with efficacy, as needed or desired. FIG. 18 illustrates a fixture 86' with a generally square or rectangular outer perimeter. This shape is preferred for planar type of applications, wherein the fixtures 86' can be mounted in a slot (not shown) or against a stop (not shown). A platform (not shown) may be used to mount the fixtures 86', generally perpendicular to the platform, to form a planar optical assembly.

Figure 19A:
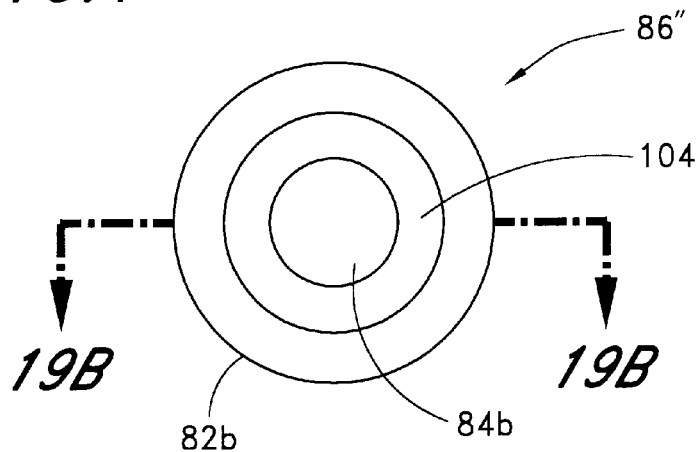
FIG. 19A is a front elevational view of yet another preferred fixture formed by the step of FIG. 14A.
Figure 19B:
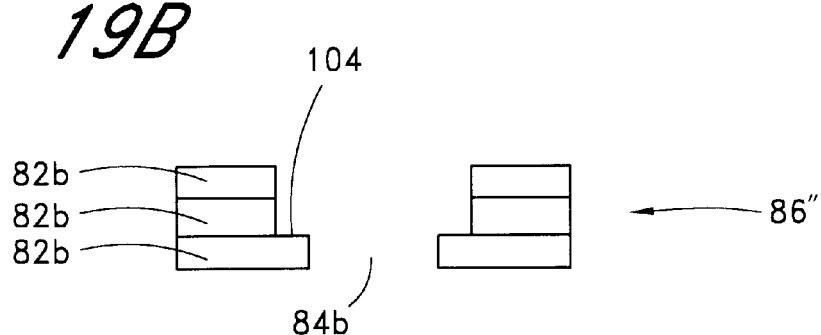
FIG. 19B is a sectional view, taken along 19B—19B of FIG. 19A.

Referring to FIGS. 19A and 19B, in one form of the present invention frames 82b may be layered to form a fixture 86" having a substantially annular seat 104, by utilizing one or more frames 82 with a cavity 84b smaller than the other cavities 84b. Such a configuration is preferred in the mounting of optical elements 92 which are generally spherical, such as ball lenses.

The method of the present invention is also well suited for the automated manufacture of the temperature compensated optical isolator 10 (shown, for example, in FIG. 5) of the present invention. Preferably, the polarizer 12 and the Faraday rotator 14 are mounted, preferably using the B-stageable epoxy, in the fixtures 86 (FIGS. 15B, 15C and 15D) to form arrays in the laminate units 90 (FIG. 14B). The thickness of the polarizer 12 and the Faraday rotator 14, which can be dependent on the wavelength requirements of the application, will dictate the number of sheets 78 (FIG. 11) needed to form a pair of respective first and second laminate units or pallets 90 (FIG. 14B). In some cases, up to two sheets 78 and up to four sheets 78 (FIG. 11) of about 0.005 inches (0.127 mm) are sufficient to house a POLARCOR™ polarizer 12 about 200 µm thick and a Latching Garnet Faraday rotator 14 about 300 to 500 µm thick, respectively. The first and second laminate units or pallets 90 (FIG. 14B) containing the respective arrays of polarizers 12 and Faraday rotators 14 are aligned and are, preferably, laser welded utilizing a Nd:YAG industrial laser, as described above, to form the laminate stack 94 (FIG. 16B). One of the pair of set of tabs 80 (FIG. 16B) associated with each polarizer-Faraday rotator optical sub-assembly 96 is removed by punching, shearing or stamping to provide clearance for the base 56 (FIG. 5). Preferably, the base 56 (FIG. 5) is then aligned with the sub-assembly 96 (FIGS. 16B and 16C) and laser welded to it.

Referring to FIG. 5, the analyzer 16 is aligned with and adhered to the bimetallic element 46. Preferably, the B-stageable epoxy or solder is used to attach the analyzer 16 to the bimetallic element 46. The bimetallic element 46 is attached to the base 56, and is preferably welded to the base 56. This results in the creation of an array of temperature compensated isolators 10 housed in the laminate stack 94 (FIG. 16B). The isolators 10 can then be trimmed out of the array by punching, shearing or stamping.

The efficiency and modularity of the method of the present invention is largely due to the lamination of arrays of micro-fixtures. It will be apparent to those skilled in the art that desirably the method of the present invention is well adapted to automated manufacturing of optical assemblies or other micro-assemblies. The method can be used in combination with conventional pick-and-place type of robotics which results in high speed, high volume production, thereby desirably maintaining low manufacturing costs. Advantageously, the method can be tailored to assemble a wide variety of optical components and is adaptable to a wide range of applications.

While the components and method of the present invention have been described with a certain degree of particularity, it is manifest that many changes may be made in the specific designs, constructions and methodology hereinabove described without departing from the spirit and scope of this disclosure. It is understood that the invention is not limited to the embodiments set forth herein for purposes of exemplification, but is to be defined only by a fair reading of the appended claims, including the full range of equivalency to which each element thereof is entitled.

What is claimed is:

1. A method of manufacturing optical assemblies, comprising the steps of:

creating in each of a plurality of sheets an array of frames;

stacking said sheets to form an array of fixtures comprising two or more pallets;

attaching an optical element in each of said fixtures to form an array of optical elements in each said two or more pallets;

layering said two or more pallets to form a lamination such that said optical elements are substantially aligned to create an array of said optical assemblies; and removing said optical assemblies from said lamination.

2. The method of claim 1, wherein said step of stacking includes the step of laminating said plurality of sheets to form said array of fixtures in said two or more pallets.

3. The method of claim 2, wherein before said step of laminating is included the step of creating an array of frames in said plurality of sheets.

4. The method of claim 3, wherein said step of creating includes the step of photo-chemically etching to form said array of frames in said plurality of sheets.

5. The method of claim 3, wherein said step of creating includes the step of stamping to form said array of frames in said plurality of sheets.

6. The method of claim 2, wherein said step of laminating includes the step of brazing to form said array of fixtures in said two or more pallets.

7. The method of claim 1, wherein said step of attaching includes the step of gluing to form said array of optical elements in each said two or more pallets.

8. The method of claim 1, wherein said step of layering includes the step of welding to form said lamination including said array of said optical assemblies.

9. The method of claim 1, wherein said step of removing includes the step of either punching, shearing or stamping to form said optical assemblies.

10. The method of claim 1, wherein between said steps of layering and removing are included the steps of:

detaching one or more tab members connected to said array of said optical assemblies; and affixing one or more bases to support one or more of said optical assemblies.

11. The method of claim 10, wherein said step of detaching includes the step of either punching, shearing or stamping.

12. The method of claim 10, wherein said step of affixing includes the step of welding.

13. The method of claim 10, wherein said one or more bases are generally yoke shaped.

14. The method of claim 10, further including the step of joining an optical component to said one or more bases.

15. A method of manufacturing a temperature compensated optical isolator, comprising the steps of:

forming an array of fixtures in a pair of first and second pallets;

attaching a polarizer in each said fixtures of said first pallet to form an array of said polarizers;

attaching a Faraday rotator in each said fixtures of said second pallet to form an array of said Faraday rotators;

layering said first and second pallets to form a lamination such that said array of said polarizers is substantially aligned with said array of said Faraday rotators to create an array of optical sub-assemblies;

affixing a base to each one of said optical sub-assemblies of said lamination;

joining a bimetallic element coupled to an analyzer to each one of said bases to form an array of said isolators; and removing said isolators from said lamination.

16. The method of claim 15, wherein said step of forming includes the step of laminating two or more sheets to form said array of fixtures in said first pallet and said second pallet.

17. The method of claim 16, wherein before said step of laminating is included the step of creating an array of frames in said two or more sheets.

18. The method of claim 17, wherein said step of creating includes the step of photo-chemically etching to form said array of frames in said two or more sheets.

19. The method of claim 17, wherein said step of creating includes the step of stamping to form said array of frames in said two or more sheets.

20. The method of claim 16, wherein said step of laminating includes the step of brazing to form said array of fixtures in said first pallet and said second pallet.

21. The method of claim 15, wherein said steps of attaching include the steps of gluing to form said array of polarizers and said array of Faraday rotators.

22. The method of claim 15, wherein said step of layering includes the step of welding to form said lamination including said array of optical sub-assemblies.

23. The method of claim 15, wherein said step of affixing includes the step of welding.

24. The method of claim 15, wherein said step of joining includes the step of welding.

25. The method of claim 15, wherein said step of removing includes the step of either punching, shearing or stamping.

26. The method of claim 15, wherein between said steps of layering and affixing is included the step of detaching a plurality of tab members from said optical sub-assemblies.

27. The method of claim 26, wherein said step of detaching includes the step of either punching, shearing or stamping.

28. A method of fabricating assemblies of small components, comprising the steps of:

creating in each of a plurality of sheets an array of frames;

stacking said sheets to form a plurality of pallets, each including an array of fixtures;

affixing said components in said fixtures to form arrays of said components in said pallets;

stacking said pallets to form a laminate stack such that said components are substantially aligned to create an array of said assemblies; and removing said assemblies from said laminate stack.

29. The method of claim 28, wherein said step of forming a plurality of pallets includes the step of laminating a plurality of sheets.

30. The method of claim 28, wherein said step of forming a plurality of pallets includes the step of molding.

31. The method of claim 28, wherein said fixtures comprise micro-fixtures.

32. A plurality of optical assemblies, comprising:

a plurality of optical elements; and two or more pallets stacked together to form a plurality of fixtures, each fixture having an optical element therein, wherein said respective pallets are formed by stacking a plurality of sheets, each sheet having a plurality of frames therein, said sheets with said frames being aligned to form said fixtures and said pallets are stacked together such that said optical elements therein form stacks of optical elements to form said plurality of optical assemblies.

* * * * *

UNITED STATES PATENT AND TRADEMARK OFFICE
CERTIFICATE OF CORRECTION

PATENT NO. : 6,126,775
DATED : October 3, 2000
INVENTOR(S) : Cullen et al.

It is certified that error appears in the above-identified patent and that said Letters Patent is hereby corrected as shown below:

Column 11,
Line 28, "Gamet" should read -- Garnet --.

Signed and Sealed this

Fourth Day of December, 2001

Attest:

*Nicholas P. Godici*

Attesting Officer

NICHOLAS P. GODICI
*Acting Director of the United States Patent and Trademark Office*